(12) United States Patent
Imtiaz et al.

(10) Patent No.: US 12,032,644 B2
(45) Date of Patent: Jul. 9, 2024

(54) SYSTEMS AND METHODS FOR DISPLAYING CONTEXTUALLY RELEVANT LINKS

(71) Applicant: MicroStrategy Incorporated, Tysons Corner, VA (US)

(72) Inventors: Nida Imtiaz, Vienna, VA (US); Victor Hugo Pena, Falls Church, VA (US); Hui Yuan, Fairfax, VA (US); Jiande Yu, McLean, VA (US); Sunit Vijayvargiya, Arlington, VA (US)

(73) Assignee: MicroStrategy Incorporated, Tysons Corner, VA (US)

( * ) Notice: Subject to any disclaimer, the term of this patent is extended or adjusted under 35 U.S.C. 154(b) by 293 days.

(21) Appl. No.: 16/804,575

(22) Filed: Feb. 28, 2020

(65) Prior Publication Data
US 2020/0192965 A1    Jun. 18, 2020

Related U.S. Application Data

(63) Continuation-in-part of application No. 16/248,659, filed on Jan. 15, 2019, now Pat. No. 11,815,936.

(60) Provisional application No. 62/720,955, filed on Aug. 22, 2018.

(51) Int. Cl.
*G06F 16/95* (2019.01)
*G06F 16/903* (2019.01)
*G06F 16/955* (2019.01)

(52) U.S. Cl.
CPC .... *G06F 16/9566* (2019.01); *G06F 16/90344* (2019.01); *G06F 16/9558* (2019.01)

(58) Field of Classification Search
CPC ............ G06F 16/9566; G06F 16/9558; G06F 16/90344
See application file for complete search history.

(56) References Cited

U.S. PATENT DOCUMENTS

| | | | |
|---|---|---|---|
| 2007/0180377 A1* | 8/2007 | Gittelman | G06Q 10/109 |
| | | | 715/764 |
| 2008/0086455 A1* | 4/2008 | Meisels | G01C 21/26 |
| 2009/0164502 A1* | 6/2009 | Dasgupta | G06F 16/9566 |
| | | | 707/999.102 |

(Continued)

*Primary Examiner* — Hares Jami
(74) *Attorney, Agent, or Firm* — Bookoff McAndrews PLLC

(57) ABSTRACT

Methods, systems, and apparatus, including computer programs stored on computer-readable media, for providing contextually relevant database content and display contextually relevant links. Techniques are described for monitoring conditions of a computing device and detecting when database content is relevant to a current context of the computing device. In some implementations, a first computing device is monitored to detect actions of the first computing device that involve calendar data for a user. In response, a determination that text corresponding to the calendar appointment includes a term associated with a particular entity is made. Data for a user information card including information related to the particular entity is obtained. The first computing device is then caused to display the user information card or an interactive control configured to initiate display of the user information card with a link element that launches an application or a web page.

20 Claims, 14 Drawing Sheets

(56) References Cited

U.S. PATENT DOCUMENTS

| | | | |
|---|---|---|---|
| 2010/0228624 A1* | 9/2010 | Morris | G06F 21/34 |
| | | | 705/14.54 |
| 2013/0179209 A1* | 7/2013 | Milosevich | G06Q 10/06 |
| | | | 705/7.18 |
| 2016/0104200 A1* | 4/2016 | Osotio | G06Q 30/0269 |
| | | | 705/14.64 |
| 2019/0116398 A1* | 4/2019 | Sharma | G06N 20/00 |

* cited by examiner

SYSTEMS AND METHODS FOR DISPLAYING CONTEXTUALLY RELEVANT LINKS

CROSS-REFERENCE TO RELATED APPLICATION

This application is a continuation-in-part of U.S. patent application Ser. No. 16/248,659, entitled "PROVIDING CONTEXTUALLY-RELEVANT DATABASE CONTENT," filed Jan. 15, 2019, which claims the benefit of U.S. Provisional Patent Application No. 62/720,955, filed on Aug. 22, 2018, the entire contents of which is incorporated herein by reference.

TECHNICAL FIELD

This specification generally relates to providing contextually relevant database content.

BACKGROUND

Databases often include information about many topics. Users often retrieve content from issuing a query, for example, using natural language or using a structured query language (SQL).

SUMMARY

According to certain aspects of the disclosure, systems, methods, and computer readable media are disclosed for displaying contextually relevant links. For instance, a method may include: monitoring to detect satisfaction of a trigger condition, of a plurality of trigger conditions, that specifies display of an information card corresponding to a particular entity on a client device; in response to detecting satisfaction of the trigger condition that specifies display of the information card, obtaining data for the information card including information related to the particular entity and a link element; displaying the information card or an interactive control configured to initiate display of the information card; when the information card is displayed, displaying the link element in the information card; determining whether a user input of a user selects the link element; and in response to determining the user input selects the link element, executing a link process.

Moreover, a client device or system may display contextually relevant links, the client device or system including: at least one memory storing instructions; and at least one processor executing the instructions to perform operations. The operations may comprise: monitoring to detect satisfaction of a trigger condition, of a plurality of trigger conditions, that specifies display of an information card corresponding to a particular entity on a client device; in response to detecting satisfaction of the trigger condition that specifies display of the information card, obtaining data for the information card including information related to the particular entity and a link element; displaying the information card or an interactive control configured to initiate display of the information card; when the information card is displayed, displaying the link element in the information card; determining whether a user input of a user selects the link element; and in response to determining the user input selects the link element, executing a link process.

Additionally, a non-transitory computer-readable medium may store instructions that, when executed by a processor, cause the processor to perform operations. The operations may comprise: monitoring to detect satisfaction of a trigger condition, of a plurality of trigger conditions, that specifies display of an information card corresponding to a particular entity on a client device; in response to detecting satisfaction of the trigger condition that specifies display of the information card, obtaining data for the information card including information related to the particular entity and a link element; displaying the information card or an interactive control configured to initiate display of the information card; when the information card is displayed, displaying the link element in the information card; determining whether a user input of a user selects the link element; and in response to determining the user input selects the link element, executing a link process.

In some implementations, a computing device may run software that monitors conditions of the computing device and detects when database content is relevant to the current context of the computing device. In response to detecting an appropriate context, the computing device may present an information card with content from the database or a control allowing the user to access the information card. This technique may allow database information to be provided automatically at the specific time that it is relevant to the user, without requiring the user to request or seek out the information. In many cases, this may allow database content relevant to a user's current task or activity to be provided, often without requiring the user to leave the current user interface. Thus, as a user creates a message, views a calendar appointment, looks up a contact from a contact book, or performs another activity, database content determined to be related may be made available from the current user interface.

In many conventional systems, a user may need to submit a query, open or switch to a specific application, or otherwise take steps to request database content. By contrast, techniques discussed in this document may enable a computing device to dynamically select and provide database information without a user request, based instead on context such as content displayed by the computing device, a location of the computing device, messages to or from the computing device, and so on.

The ability to dynamically provide database content as the context of a computing device changes may be particularly useful for mobile devices. Software on the computing device that runs in the background may cause information cards to be presented on various interfaces of an operating system or third-party applications. For example, the presentation of information cards with database content may be integrated with a messaging application, a calendar application, search functionality, or any other application or interface of the mobile device.

As discussed further below, both the timing for providing database content and the selection of the content provided may be determined using context of the computing device. One aspect of context that may be used is the presence of terms referring to entities, such as people, locations, objects, companies, etc., having corresponding records in a database. A computing system may dynamically retrieve and present information corresponding to an entity based on monitoring context-specific trigger conditions on a computing device. The information cards may include database content that is indexed by keywords, such as entity names, metadata for the entity, or topics associated with an entity classification. For example, a computing device may run an application that monitors activity on the computing device to determine if trigger conditions related to keywords have been satisfied. Examples of these triggers may include the presence of an entity-related keyword in a user interface, an email or text message, a calendar reminder or record, a search query or search result, speech recognition of a voice query, a video or image collected by a camera, among others.

If a trigger condition is satisfied, the application may cause an information card or information panel to be displayed on or spoken through the computing device. This technique may allow a user to easily access or obtain information that is contextually relevant to actions performed on the computing device, without requiring the user to manually access the information or provide additional inputs. As discussed below, other techniques disclosed herein may also provide other advantages, such as allowing users to receive information that may be difficult to manually retrieve from a database.

In some implementations, the information cards may be displayed on a computing device without requiring a user to request that information be displayed. The computing device may run an application that monitors actions performed on the computing device. The application may use the monitored actions to track the occurrence of keywords that may then be used to display information cards at specified points in time when the user is likely to view information included in the information cards. For example, the application may monitor calendar data, including notifications or reminders issued by a separate calendar application, to detect an upcoming calendar appointment. The application may determine that the calendar data includes text corresponding to an entity associated with a user information card. In response, the application then may cause the information card to be displayed on the computing device. For example, the application may cause the information card to be presented along with a notification from the calendar application, or based on the appointment time (e.g., fifteen minutes before the start time of the calendar appointment so that the user may access relevant entity information during the calendar appointment). The application may minimize the burden imposed on the user, as the user does not need to open a calendar application, or look up an appointment, or even know that database content relevant to the appointment is available. Still, the computing system may provide contextually relevant information for the appointment triggered by monitoring the calendar data and without requiring the user to perform any actions to instruct the mobile device to retrieve the information card.

The keywords monitored by the application may be customized for different actions performed on the mobile device and a user's account. In some instances, the set of keywords that trigger display of database content may be specific to a user or the user's organization. For example, when the user is an employee of a company, the keywords of interest may be extracted from a private database for the company. The keywords may additionally or alternatively be selected or filtered to terms applicable to the specific user, e.g., terms relevant to the user's role in the company. When one of the keywords is determined to be present in the user interface, the application may communicate with a server system to obtain information related to the keyword. This information may include data retrieved from a private database that has information specific to an organization associated with the user.

In one general aspect, a method is performed by one or more computing devices. The method may include: monitoring, by the one or more computing devices, a first computing device to detect actions of the first computing device that involve calendar data for a user; in response to detecting an action of the first computing device that is associated with a calendar appointment for the user, determining, by the one or more computing devices, that text corresponding to the calendar appointment includes a term associated with a particular entity; in response to determining that the text corresponding to the calendar appointment includes the term associated with the particular entity: obtaining, by the one or more computing devices, data for a user information card including information related to the particular entity; and causing, by the one or more computing devices, the first computing device to display the user information card or an interactive control configured to initiate display of the user information card.

One or more implementations may include the following optional features. For example, in some implementations, the interactive control configured to initiate display of the user information card may include a notification displayed on the first computing device before the user has logged into the first computing device.

In some implementations, the method may also include: receiving, by the one or more computing devices, an indication that the user has selected the notification and logged into the device; and in response to receiving the indication, causing, by the one or more computing devices, the first computing device to display the user information card.

In some implementations, the method may include performing additional operations in response to determining that the text corresponding to the calendar appointment includes the term associated with the particular entity. For example, the method may include: selecting, by the one or more computing devices, a template for the user information card from among a plurality of templates that each specify a different format for the user information card; and generating, by the one or more computing device, the user information card based on the data for the user information card including information related to the identified entity and the template selected for the user information card.

In some implementations, each template included in the plurality of templates may specify a different subset of information fields for the information related to the identified entity.

In some implementations, the first computing device may be monitored by an application that runs on the first computing device. Additionally, actions of the first computing device that involve calendar data for a user may be detected by the application and the application may determine that text corresponding to the calendar appointment includes the term associated with a particular entity.

In some implementations, causing the first computing device to display the user information card may include causing the first computing device to launch the application to display the user information card in a user interface of the application.

In another general aspect, a method is performed by one or more computing devices. The method may include: accessing message data for one or more messages in a message thread shown on a messaging user interface of a client device; determining, based on the message data, that at least one message in the message thread includes a term corresponding to a particular entity; in response to determining that the at least one message in the message thread includes the term corresponding to the particular entity: obtaining data for an information card for the particular entity; and providing, in connection with the messaging user interface, a control configured to insert, in a message for the message thread, an information card describing the particular entity, the information card including (i) an image of the information card accessible to all recipients, and (ii) data configured to cause a receiving device, configured with one of a predetermined set of user credentials, to identify and display additional information about the particular entity.

One or more implementations may include the following optional features. For example, in some implementations, the method may also include: receiving data indicating interaction with the control on the client device; and in response to receiving the data indicating interaction with the control on the client device, providing, to a receiving device that communicates with the client device, a second control that causes the receiving device to request an information card for the particular entity from a server.

In some implementations, identifying the additional information about the particular entity may include: identifying a set of user credentials for a user of the receiving device; and determining, from among a set of information about the particular entity, a subset of information is permitted for access by the user of the receiving device based on the identified set of user credentials for the user of the receiving device.

In some implementations, the client device may be configured with a first set of user credentials of the predetermined set of user credentials. Additionally, the method further may include determining that the first set of user credentials do not provide access to the additional information about the particular entity.

In some implementations, the receiving device may be configured with a second set of user credentials of the predetermined set of user credentials. Additionally, the method further may include: determining that the second set of user credentials provides access to the additional information about the particular entity; in response to determining that the second set of user credentials provides access to the additional information about the particular entity; and causing the receiving device to display the additional information about the particular entity in response to receiving an input selecting an image of the information card shown on a messaging user interface of the receiving device.

The details of one or more Implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 8A-8E depict graphical user interfaces (GUIs) for authoring an information card that includes a link for a link display process, according to one or more embodiments.

FIGS. 9A-9B depict graphical user interfaces (GUIs) for displaying an information card that includes a link for a link display process, according to one or more embodiments.

Like reference numbers and designations in the various drawings indicate like elements.

DETAILED DESCRIPTION

Figure 1:
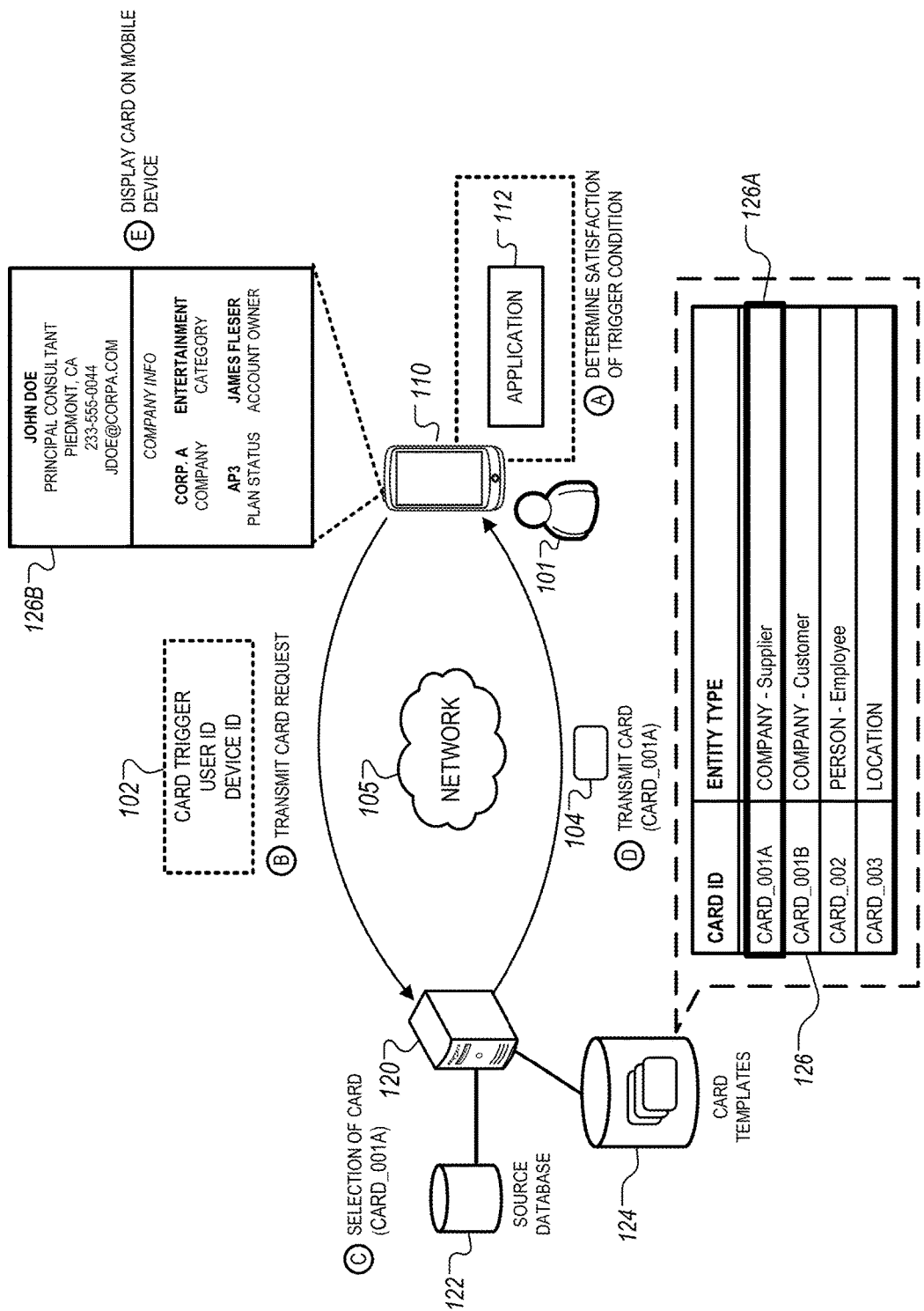
FIG. 1 illustrates an example of a system that is capable of dynamically generating and displaying information cards based on the context of a computing device.

FIG. 1 illustrates an example of a system 100 that is capable of dynamically generating and displaying information cards. The system 100 may include a client device 110, a server 120, and a network 105. The server 120 may have access to a source database 122 for an organization. The server 120 may be implemented using multiple computers that cooperate to perform the functions discussed below, and which may be located remotely from each other.

The client device 110 may include an application 112 that enables the client device 110 to dynamically generate and display contextually relevant information cards in response to certain actions being performed on the client device 110 and/or certain conditions of the client device 110 being detected. As discussed below, the application 112 may allow the client device 110 to obtain and provide information from the source database 122 through information cards that may be dynamically adjusted based on the actions and/or conditions detected on the client device 110. In some implementations, the application 112 may run in the background, out of view of the user, and monitors conditions of the client device 110 on an ongoing basis. The application 112 may interact with an operating system of the client device 110, for example, using one or more application programming interfaces (APIs), to obtain various types of content, such as image data and/or text displayed on screen, image data or text of user interfaces of applications (which may or may not be currently displayed on screen), device notifications, messages (e.g., e-mails or SMS text messages), calendar data, received radiofrequency beacon messages, and so on.

The client device 110 may be associated with a user 101. When the application 112 is installed, a user identifier for the user 101 may be determined. For example, on installation or afterward, the user 101 may log in using one or more credentials. The application 112 may then customize various aspects of the system for the user 101, including the trigger conditions used to detect an appropriate context for providing an information card as well as the type of content included in information cards.

In the example, the user 101 may be a member of an organization, e.g., an employee of a company. The source database 122 may represent database records stored by or for the organization. The records may not be publicly available and may be subject to data access restrictions, such as requirements that users be issued credentials from the organization that grant authorization to access the records. Different users may be granted different levels of authorization, and the server 120 may enforce access restrictions so that each user is only allowed to access the subsets of information the user is authorized to access.

The system 100 may improve techniques used to provide users with access to information in a more convenient and contextually relevant fashion. Information is presented through information cards that may be displayed at specified points in time based on the satisfaction of context-based trigger conditions representing the relevance of specific topics or keywords to the activities of the client device 110. In this manner, the system 100 may improve the relevance of information that is displayed to a user based on actions performed on the client device 110 and ensure that the displayed information is likely to represent information that is of interest to the user, at the time information is of interest to the user. Unlike many other systems, the user 101 does not need to manually submit a query or select from a list to obtain the information. Instead, the application 112 may initiate display of the information as it detects that the information corresponds to the current context of the client device 110.

In FIG. 1, information cards may be presented on the client device 110 as cards that include information obtained from the source database 122. The cards may include dynamically generated information so that they reflect changes to data stored in the source database 122. For example, the server 120 may store card templates 124 that identify, for example, the format and structure of the cards. The specific information that is displayed in the cards may be dynamically populated into the templates at the time the cards are determined to be relevant, so that each display of a card may include information generated from up-to-date information from the source database 122. Thus, if the same card for the same entity is displayed at different times, the content may be different for each instance of the card as the information in the source database 122 changes.

The card templates 124 may include different templates for different types of entities. For example, one template may be used for a person, another template may be used for a company, another template may be used for a location (e.g., a particular store or region), and so on. Different card templates 124 may also be defined and used for entities having different semantic relationships with the user 101, the user's organization, or others. For example, a first template may be used for companies that are customers, and may specify a first set of statistical measures to display in a card. A second template for suppliers may specify a different set of statistical measures to display in a card.

Briefly, in the example of FIG. 1, the application 112 on the client device 110 may detect a context-based condition, such as a keyword representing an entity having corresponding information in the database 122. The application 112 may cause the client device 110 to request an information card, and the server 120 may select an appropriate information card, generate the information card, and send data for the card back to the client device 110 for display. The example may be explained in further detail below with respect to various stages labelled (A) through (E).

In stage (A), the application 112 may monitor activity on the client device 110 to detect satisfaction of a trigger condition that specifies display of an information card on the client device 110. Trigger conditions may represent activity on the client device 110 indicating that the user 101 is likely to view or hear information.

The trigger conditions may be monitored passively without requiring the user 101 to provide input on the client device 110. For example, detection of an entity term in the text corresponding to an upcoming calendar appointment through a calendar application of the client device 110 may represent satisfaction of a trigger condition indicating that a user is likely to view information associated with the entity. In this example, the client device 110 may monitor calendar data of the calendar application without the user 101 actively requesting the information, which may reduce the number of user inputs required to display contextually relevant information (i.e., information for an entity that is a participant to the calendar appointment).

In another example, the trigger condition may represent a location of the client device 110 being detected to be within threshold proximity (e.g., within 100 meters) of a conference center that is associated with information cards. In this example, the application 112 may determine that the user 101 is likely to view conference information based on the location of the client device 110 and thereby determine that a trigger condition has been satisfied.

In some instances, the trigger conditions may represent an action performed by the user on the client device 110 that relates to a particular entity or topic. For example, detection of a message that includes a term corresponding to an entity may represent satisfaction of a trigger condition related to displaying information of the entity. In some other examples, the trigger condition may represent a search query received for an entity term, or some action performed on the client device 110 that indicates that the user 101 is requesting information, e.g., performing a web search through a browser application, performing a search using capabilities of the operating system (e.g., for an application, a file, etc.), a click, finger tap, gesture, cursor hover, keystroke, among others.

In stage (B), the client device 110 may transmit a card request 102 to the server 120. The card request 102 may indicates the term(s) identified as corresponding to an entity, or an indication of the entity determined to be relevant to the current context. Accordingly, the card request 102 may include monitored data collected at the client device 110, such as data indicating the trigger condition that was determined to be satisfied by the application 112. The card request 102 may also include an identifier for the user 101 and/or the client device 110. The identifiers may be used to customize the information that is displayed on the client device 110. For example, the organization managing the source database 122 may specify different levels of access to the source database 122 based on a user classification specified by a user or device identifier. In this manner, the system 100 may generate and display different information cards for users in response to satisfaction of the same trigger condition.

In stage (C), upon receiving the card request 102, the server 120 may access the source database 122 and generate one or more information cards that are provided to the client device 110 in response to the card request 102. The server 120 may generate information cards that are relevant to entity terms corresponding to the trigger condition detected in stage (A). For example, the server 120 may generate cards that include information for an entity that the client device 110 identified in text in a user interface of the client device 110, such as a calendar appointment, a text message, a search interface, etc., even though the text is found in a user interface of the operating system or an application different from the application 112. In some situations, the reference to the entity may have been detected by the client device 110 in data that is not part of a user interface, such as the content of a notification, message, or record accessed by the client device 110. In this example, the selected information cards may include information corresponding to the entity in the source database 122.

The server 120 may also perform various text processing techniques in selecting cards to provide for output to the client device 110. For example, the server 120 may identify terms included in a text message received by the client device 110 and determine if the text message includes keywords that are associated with information stored in the source database 122, or are associated with a card template from among the card templates 124. The server 120 may compare terms in the text message with keywords associated with the source database 122 to identify matching terms. When server 120 identifies one or more matches, the server 120 may populate a card template with information that is indexed in the source database 122 as corresponding to the matched terms. In some scenarios where keywords match multiple possible card templates, e.g., information cards for two employees with the same name, the server 120 may either display all relevant cards, or alternatively, request the user to provide additional information to determine the correct entity associated with the keywords.

In addition to selecting the information from the source database 122, the server 120 may also select a card template from among the card templates 124. The server 120 may use the selected information and selected template to generate information cards that are presented on the client device 110. The server 120 may access a table 126 to determine the information from the source database 122 to include in a card template from the card templates 124. The table 126 may include a card identifier that specifies a card template included in the card templates 124, and for each card identifier, one or more associated entity terms and term classifications. As shown in FIG. 1, the table 126 identifies different types of entity terms, e.g., "COMPANY," "PERSON," "LOCATION" for which different cards may be generated. The table 126 may also multiply card templates for entities of the same entity type. For example, the table 126 specifies a template "CARD_001A" for a supplier and a template "CARD_001b" for a customer although both the supplier and customers are classified as companies.

In some implementations, the server 120 may examine contextual factors associated with the client device 110 that may be of interest to identify a card template that may be the most appropriate to selected information selected from the source database 122. For example, if calendar data indicates that the user 101 is presently in a meeting, then the server 120 may select a card template that provides less information than in a scenario where, for example, the calendar data indicates that the user 101 is not actively in a meeting (and has more bandwidth to interact with the information card). As another example, the server 120 may provide an information card that is a notification in scenarios where a user's participation is expected to be limited, and an interactive information card that allows the user to manipulate information displayed in the information card when the user's attention is more likely to be focused on the display of the client device 110. In some instances, the type of trigger condition that is detected at the client device 110 may be the contextual factor that the server 120 uses to select the appropriate card template.

In stage (D), the server 120 may transmit an information card 104 for presentation on the client device 110. In stage (E), upon receiving the information card 104 from the server 120, the client device 110 may present the information card 104 for display on a user interface 126<sub>6</sub>. The information card 104 may be presented in or with the current user interface of the client device 110, which may be outside the application 112. For example, the information card 104 may be provided through the operating system (OS) functionality of the client device 110 outside of the application 112, e.g., as an OS notification. In general, the information card 104 may be displayed in, alongside, or on (e.g., as an overlay to) the application or interface that has the term(s) that triggered the presentation of the information card 104, such as the current interface of the client device 110, whether the current application or interface is one for messaging, search, calendar management, and so on, or even a lock screen or home screen showing general system notifications. In some instances, the information card 104 may be presented through the application 112, e.g., as an application message, or a data object presented on a user interface of the application 112. The information card 104 may also be displayed in different formats, such as an image, an interactive control configured to initiate display of the information, e.g., a button that displays the information in response to receiving a user input.

In the example depicted in FIG. 1, the application 112 may detect an upcoming calendar event for an upcoming meeting with an employee of the entity "Corporation A." The application 112 may determine that a calendar event trigger condition has been satisfied based on processing calendar data of the client device 110 and determining that text corresponding to the calendar event references the entity. The server 120 may receive the card request 102 from the client device 110 and select card template "CARD_001A" identified in row 126A of the table 126 and specifies the generation of an information card 104 for a supplier "JOHN DOE" identified in the calendar appointment. The server 120 may obtain information associated with "JOHN DOE" from the source database 122.

As shown in FIG. 1, the information card 104 displayed on the user interface 126B may include information for "JOHN DOE," an employee of supplier company. The server 120 may select information for this employee from the source database 122 since the calendar appointment detected by the application 112 identifies "JOHN DOE" in the text of the calendar appointment. In this example, the system 100 may passively processes calendar data to determine that the user 101 has an upcoming meeting with "JOHN DOE" and would benefit from receiving employee information prior to or during the meeting.

In some implementations, the system 100 may be configured to deliver information cards to the client device 110 based on processing activity or usage data collected on the client device 110 and determine times when an information card is to be relevant to actions being performed on the client device 110, such as the user writing an email, the user viewing a calendar appointment, or other scenarios where the user accesses data corresponding to entity-specific information. For example, the server 120 may collect usage data collected by the operating system of the client device 110 that indicates application usage times, time periods of frequent device usage, types of applications or webpages being accessed by the user, among other types of usage metrics. The server 120 may use pattern recognition techniques to process the usage data to predict points in time when certain information cards are likely to correspond to terms that are being accessed during actions being performed on the client device 110. As an example, if the usage data indicates that the user frequently reads articles between 7 AM and 8 AM every morning that reference certain business entities, then the server 120 may provide information cards that include information on stocks for the business entities to the user during that time frame. The server 120 may also adjust the content included in the information cards over time so that only information for entities that are often referenced in the articles read by the user are included in the information cards that are provided to the client device 110.

Additionally, the application 112 may configure the client device 110 to display data representing the information cards in a non-obtrusive manner. For example, the application 112 may provide an operating system notification on the client device 110 once the client device 110 has received an information card from the server 120 instead of redirecting the client device 110 to the information card and potentially disrupting the present activity being performed by the user. In some instances, information cards that are received by the client device 110 over a certain time period may be accumulated by the application 112. A reminder may then be sent to the client device 110 at a specified point in time that allows the user to access all accumulated information cards. For example, a reminder may be displayed on the client device 110 every morning, when then allows the user to view information cards received on the preceding day.

Figure 2:
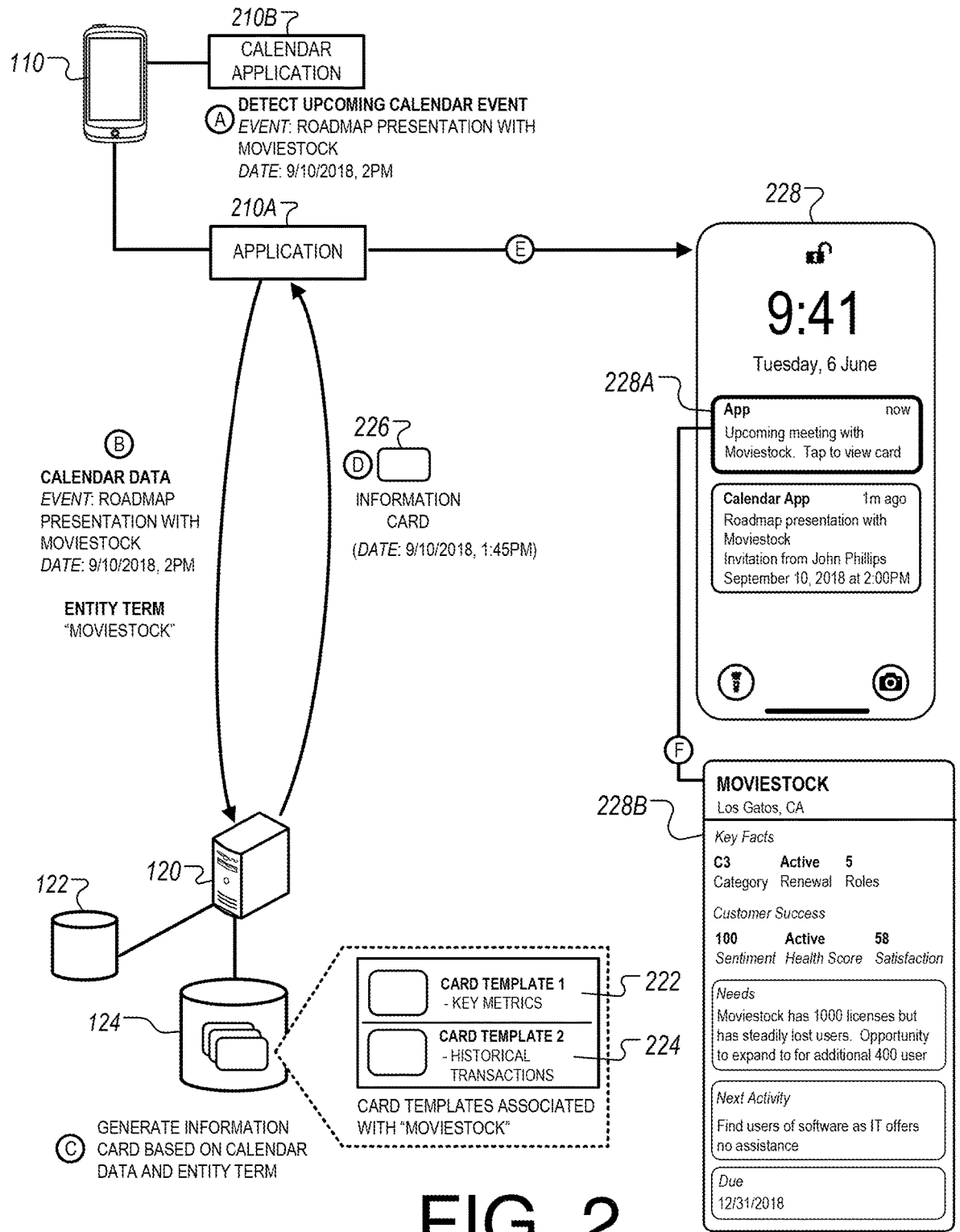
FIG. 2 illustrates an example of a technique for displaying information cards based on monitoring calendar data.

In some implementations, the system may be capable of outputting information cards or data associated with information cards while a user accesses various applications running on the client device 110. In such implementations, the application 112 may run as a background process and monitor user activity on other applications to detect the satisfaction of trigger conditions. For example, if a user highlights or selects text that is displayed through a web browser application on the client device 110, the application 112 may detect that a trigger condition has been satisfied and the highlighted or selected text may be used as entity terms to identify and output information cards corresponding to the highlighted or selected text. In some instances, the user may be provided with a notification that indicates that relevant information cards are available for the highlighted or selected text, and upon selection, the user may be directed to the application 112 to access the information cards FIG. 2 illustrates an example of a technique for displaying information cards based on monitoring calendar data. In this example, an application 210A running on the client device 110 may passively monitor a calendar application 210B of the client device 110 to detect actions that involve calendar data. The application 210A may instruct the client device 110 to display information cards if text corresponding to calendar data includes terms corresponding to an entity for which information is stored in the source database 122.

In stage (A), the application 210A may monitor calendar data of the calendar application 210B to detect an upcoming calendar appointment. The calendar appointment may be detected without requiring any user input on the client device 110 since the application 210A runs as a background process that periodically monitors calendar data. The application 210A may parse text data included in with calendar appointment (e.g., text fields representing organizer, time, location, and title) to determine if the parsed text data includes an entity term. In FIG. 2, the application 210A may determine that the event description of the calendar appointment includes the entity term "MOVIESTOCK," which is a company for which corporate information is stored in the source database 122.

In stage (B), the application 210A may provide calendar data associated with the detected calendar appointment and the entity term to the server 120. The calendar data may include texts that the application 210A determines includes the entity term.

In stage (C), the server 120 may generate an information card to be displayed on the client device 110. The server 120 may retrieve information stored in the source database 122 corresponding to the entity term. The server 120 may also select a card template from among the set of pre-defined card templates 124 for generating the information card. As discussed above, the set of card templates 124 may include different types of cards, e.g., cards displaying different types of entity information, or cards with different formats, e.g., cards with different combinations of information fields for the same entity information. The server 120 may select the card template to be used to generate the information based on different factors, such as the type event represented by the calendar data, context data collected on the client device 110 in association with the calendar appointment, or a time of day associated with the calendar event.

In FIG. 2, the server 120 selects card template 222, which may include key transaction metrics for the entity "MOVIESTOCK," for generating the information card. This selection may be based on the event title of the calendar appointment indicating that the meeting is a roadmap presentation. The server 120 may determine that the key metrics displayed in card template 222 are more likely to be of interest to a user of the client device 110 during the calendar appointment compared to the historical transactions included in the calendar template 224.

The server 120 may dynamically access information stored in the source database 122 so that the information displayed on the information card 226 represents up-to-date data metrics at the time of card generation. To accomplish this, the server 120 may identify information fields that are included in the selected card template 222, identify corresponding values for the information fields in the source database 122, and insert the identified values in the information values. In this manner, the server 120 may reduce the likelihood that the card includes obsolete or outdated information when presented on the client device 110. The technique depicted in FIG. 2 may therefore be used to more accurately display entity information that is frequently adjusted over time. In stage (D), the server 120 may provide the information card 226 to the application 210A.

In stage (E), upon receiving the information card 226, the application 210A may cause the client device 110 to display a notification 228A on a user interface 228 of the client device 110. In FIG. 2, the user interface 228 may represent a lock screen where system notifications are displayed to a user before he/she logs into the client device 110. The notification 228A may be handled by the operating system of the client device 110 and configured to prevent sensitive information of the card 226 to be displayed on the user interface 228. For example, notification 228A may identify that a card is available for access on the client device 110 without actually displaying the information that is included in the card. A user may interact with the notification 228A to access the sensitive information that is actually included in the information card 226.

Additionally, the application 210A may cause the client device 110 to present the notification 228A independently of other system notifications, such as a notification for the calendar application identifying the upcoming calendar appointment. This feature may allow the user to view the information card as a supplement to calendar notifications for a calendar event.

In stage (F), the client device 110 may present a display 228B of the information card 226 once a user interacts with the notification 228A, e.g., by providing an input selecting it. The display 228B may be presented through an interface of the application 210A. For example, once the user interacts with the notification 228A, the client device 110 may be configured to execute the application 210A and present the display 228B through the application. Alternatively, the client device 110 may present the display 228B as a pop-up window that runs in the operating system of the client device 110 and without launching the application 210A.

In some implementations, the display 228B may be passively presented on the client device 110 at a designated point in time without requiring the user to provide an input selecting the notification 228A. For example, if the user is logged into the client device 110 and actively using the client device 110, the client device 110 may be configured to present the display 228B either five minutes before, or at the start time of, the calendar appointment. In this way, the display 228B may be presented without requiring the user to perform any additional actions on the client device 110, which may allow the user with access to relevant information, e.g., key facts and metrics for an entity, without requiring the user to search for the information or perform actions to display the information.

Figure 3:
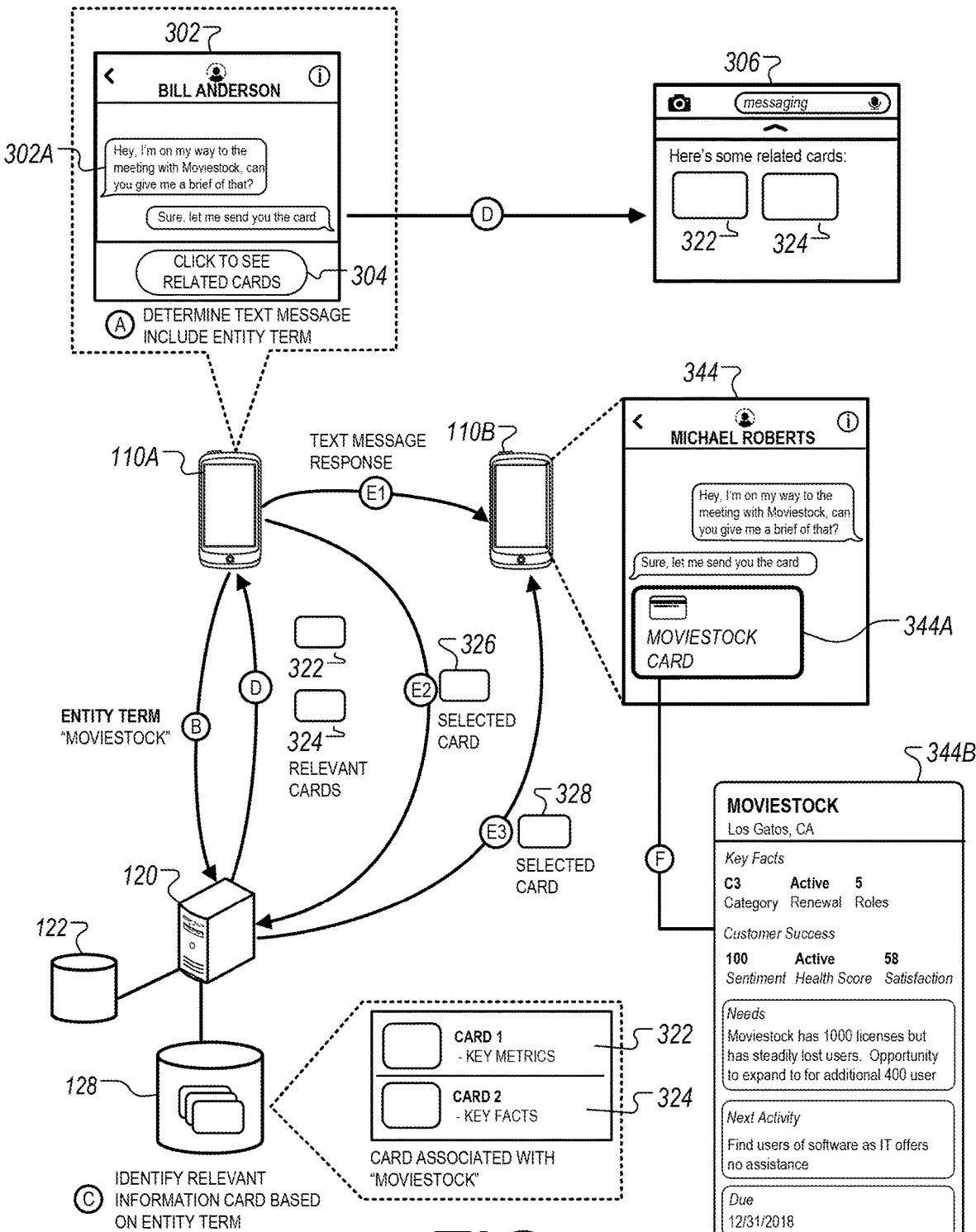
FIG. 3 illustrates an example of a technique for displaying information cards based on monitoring messaging data.

FIG. 3 illustrates an example of a technique for displaying information cards based on monitoring messaging data. In this example, an information card may be exchanged between two client devices 110A and 110B during a text conversation. The server 120 may manage presentation of the information card based on monitoring text messages of the text conversion and privileges associated with the users.

In stage (A), the client device 110A may monitor message data and determine that a message 302A in a message thread shown on a messaging user interface 302 includes a term corresponding to an entity. In FIG. 3, the message 302A may include the term "MOVIESTOCK." The client device 110 may determine that this term represents a company for which information is stored in the source database 122 and is associated with information cards stored in the card database 128. In stage (B), the client device 110A may notify the server 120 that the entity term was detected in the message 302A.

In stage (C), the server 120 may identify information cards in a card database 128 that are relevant to the entity term that was detected in the message 302A. The card database 128 may include pre-generated information cards that include information that is stored in the source database 122. The server 120 may identify the relevant information cards by using the entity term as a search index to identify information cards that, for example, include the entity term itself or include information corresponding to the entity. In FIG. 3, the server 120 may identify two relevant information cards 322 and 324 that are each associated with the entity "MOVIESTOCK" and include different types of information for the entity. Information card 322 may include information relating key metrics of the entity, while information card 324 may include information relating to key facts of the entity. In stage (D), the server 120 may provide the information cards 322 and 324 to the client device 110 for display in a list of options for selection by the user.

In stage (D), upon receiving data indicating the information cards 322 and 324, the client device 110 may provide a button 304 on the messaging user interface 302. The button 304 may be selected by a user to view information cards that the server 120 determines are likely to be relevant to the entity term included in message 302A.

After the user selects the button 304, the client device 110 may present an interface 306 that may allow the user to select an information card from among a list of relevant information cards. In FIG. 3, the interface 306 may be displayed in the messaging application that includes the messaging user interface 302. The interface 306 includes interface elements for information cards 322 and 324 that may be selected by the user.

In stage (E1), once the user selects one or more information cards provided on the interface 306, the client device 110A may transmit a text message to the client device 1106. The text message may include a reference to the selected information cards, such as a thumbnail previewing the information card, a deep link for accessing the selected information card, or other types of data structures that do not include the information card itself. The user of the client device 1106 may be required to log into, for example, an application prior to accessing the information that is included in the information card. This may be used to ensure that the user that is provided with a text message actually has sufficient privileges to access the information.

In stage (E2), the client device 110 may send the selected information cards to the server 120, which, in stage (E3), provides the selected information cards to the client device 1106. In FIG. 3, the user may select information card 322 and the client device 110 may transmit data 326 indicating the selected card to the server 120. The server 120 then may transmit an information card 328 corresponding to the selected information card 322 to the client device 110B. As discussed below, in some instances, the selected information cards 322 and 328 may represent different information cards that includes different subsets of information based on the access privileges of the sending and recipient users. By managing the transmission of the information cards to each client device, the server 120 may ensure that a user is not provided with an information card that he/she is not authorized to access through a message conversation with another user.

In stage (F), the client device 110B may display a messaging user interface 344 that may include messaging conversation with the user of client device 110A. The messaging user interface 344 may include a message 344A that is received from the client device 110A during the messaging conversation. As discussed above, the message 344A might not actually display or include information specified by the information card 322. Instead, the message 344A may be an interactive element that allows the user to access the information card 328 received from the server 120 after the user of the client device 110B has been authenticated with the server 120. For example, the message 344A may include data, e.g., metadata, parameters, executable code, that may be interpreted by an application running on the receiving device 110B to a perform a request and display for additional information, or an enhanced information card that includes more information that the information card 236. In some instances, once the user selects the message 344A, the selection may cause the client device 110B to launch the application. The application may require the user to log in with credentials provided by an organization that manages the source database 122 and configures access to the card database 128. Once the user has logged in, the application may display the information card 328 received from server 120 on the interface 344B. The user may then access the information included in the information card 328 through the interface 344B.

In some implementations, the technique depicted in FIG. 3 may be used to provide users of different classifications with different levels of access to information about an entity. The server 120, in such implementations, may generate different versions of information cards to provide different levels of access to the information about an entity. For example, publicly available information about an entity may be included in each of the version of the information cards, whereas sensitive information about the entity (e.g., confidential financial information, trade secret information, competitive business information) may be included in only some versions of the information cards. The server 120 may determine the version of an information card to provide a client device based on a set of access privileges assigned to a user of the client device. For example, a managing director of an organization may be granted a set of access privileges that provides greater access to entity information compared to the set of access privileges granted to an entry-level analyst. The server 120 may use the different sets of access privileges to determine that a client device assigned to the managing director may receive all information cards (including those that include sensitive information) whereas the device assigned to the analyst may only receive information cards that do not include sensitive information.

In the context of a messaging conversation shown in FIG. 3, the server 120 may use different sets of access privileges to provide different versions of information cards to the client devices 110A and 110B even though they exchange messages over a single messaging thread. For example, when a user selects the message 344A, the server 120 may determine the access privileges of the user to determine the version of the information card that the user has access to. In some instances, if the user of the client device 110B (recipient device) has a greater set of access privileges than the user of the client device 110A (transmitting device), then the information card displayed on the interface 344B may include additional information about the entity that is not accessible by the client device 110A. In this regard, the messaging interface shown in FIG. 3, may allow different participants of a messaging thread to receive customized levels of access to entity information based on a set of access privileges that are assigned to them.

In another example, a first user that selects and provides an information card on the client device 110A may have higher set of access privileges compared to a second user that receives the information card on the client device 110B. The server 120, in this example, may adjust the information card that is selected by the first user on the client device 110 such that any sensitive information that the second user is not privileged to access is removed from the information card 328, which is provided to the client device 110B. Thus, the information presented on the interface 344B only includes information that is customized for the access privileges of the second user and does not include information that the first user has access to even though the first user is the user that provides the message 344A to the second user. In this way, the system may ensure that information exchanged by users of different classifications does not result in sensitive information being compromised.

In some implementations, information cards may be shared between users that have sufficient access privileges to view or access the shared information cards. For example, after a user has accessed an information card on his/her device, the user may share the accessed information card with another user through any suitable communication means, such as through the application 210A, email, a Bluetooth device pairing connection, a text message, a proximity-based connection, among others. As discussed above, once the recipient has received the information card, the system determines whether the recipient has sufficient access privileges to access the shared information card before providing access to the shared information card.

Figure 4:
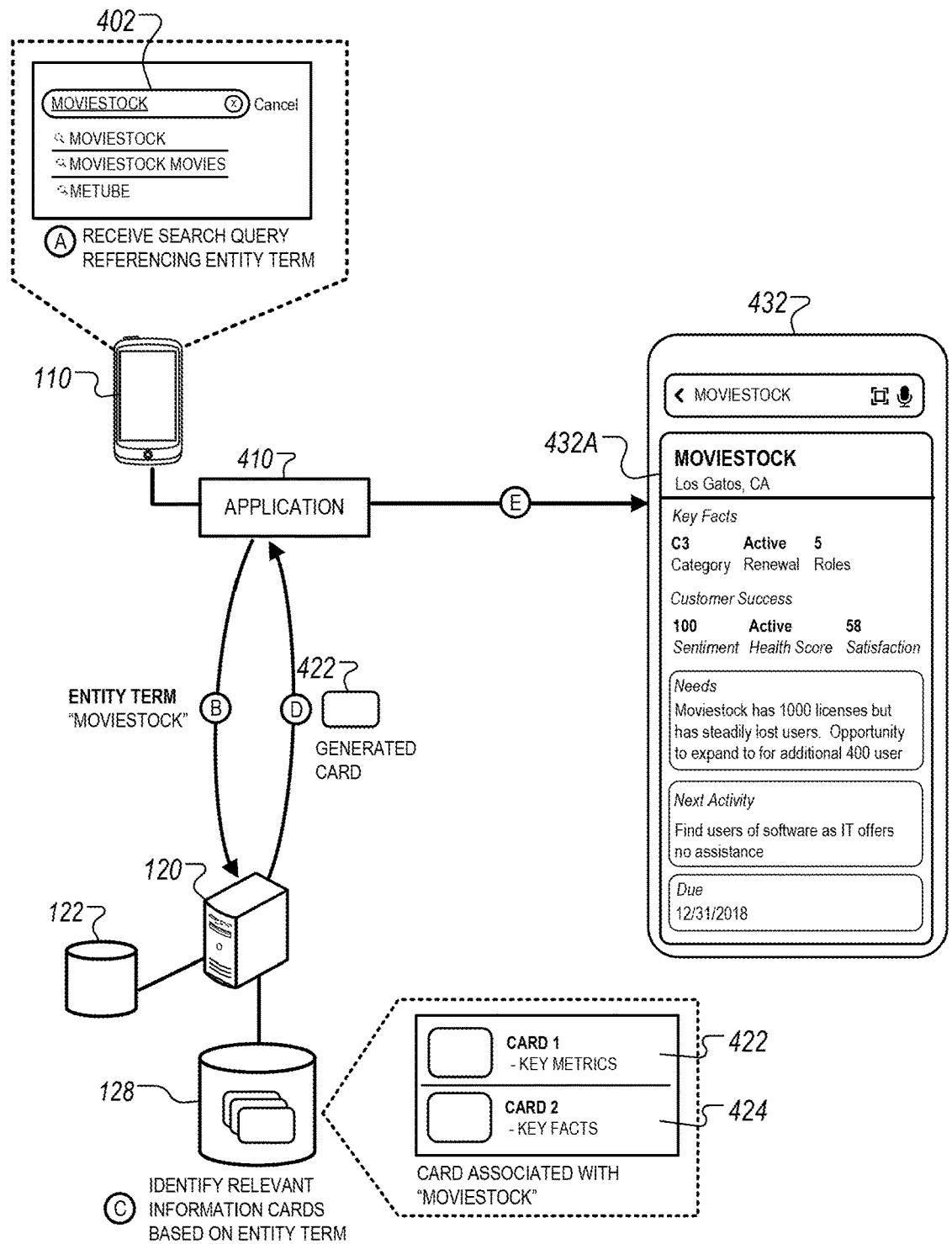
FIG. 4 illustrates an example of a technique for displaying information cards based on monitoring search data.

FIG. 4 illustrates an example of a technique for displaying information cards based on monitoring search query data. In this example, an information card may be displayed on the client device 110 in response to receiving a search query from a user.

In stage (A), the client device 110 may receive a search query from a user. The search query may be a text query that is provided, for example, using a built-in search engine provided through the operating system of the client device 110, a search engine provided through application 410, or a network-based search engine used to perform a web search. In some instances, the search query may be a voice query that is provided, for example, through a personal assistance service associated with the client device, or an automated speech recognizer provided through the application 112.

In FIG. 4, the user may submit a search query 402 in a search field of a built-in search engine provided through the operating system of the client device 110. The search engine may enable a user to perform a system-wide search and provide results responsive to the search query, including results for operating system components or results for application data for applications installed on the client device 110, such as the application 410. The application 410 may detect the search query 402 and determine that the search query 402 includes a term corresponding to an entity "MOVIESTOCK" using similar text processing techniques discussed above. In stage (B), the application 410 may notify the server 120 that an entity term was detected in the search query 402.

In some implementations, the application 410 may identify the presence of entity terms in either the search query provided by the user or search results that are generated by a search engine in response to the received search query. For example, in FIG. 4, the application 410 may process the text of the search query 402 as well as text of the results "MOVIESTOCK," "MOVIESTOCK MOVIES," and "METUBE" that are generated by the search engine as being responsive to the search query 402. The application 410, in this example, may determine that the result "METUBE" also represents a term corresponding to another entity. In stage (B), the application 410 may therefore notify the server 120 to identify information cards for both entities "MOVIETUBE" and "METUBE."

In stage (C), the server 120 may identify information cards in the card database 128 that are relevant to the entity term that was detected in the message 302A. The card database 128 may include pre-generated information cards that include information that is stored in the source database 122. The server 120 may identify the relevant information cards by using the entity term as a search index to identify information cards that, for example, include the entity term itself or include information corresponding to the entity.

In some implementations, the server 120 may provide card data to the client device 110 prior to the selection of relevant information cards or card templates for display on the client device 110 in response to a trigger. In such implementations, the card data may be downloaded locally onto the client device 110 so that the identification of relevant information cards using entity terms may be performed without requiring a connection to the server 120. For example, the client device 110 may access downloaded card data offline (i.e., without a network connection) to identify relevant information cards for output on the client device 110.

In FIG. 4, the server 120 may identify two relevant information cards 422 and 424 that are each associated with the entity "MOVIESTOCK" and include different types of information for the entity. Information card 422 may include information relating key metrics of the entity, while information card 424 may include information relating to key facts of the entity. In stage (D), the server 120 may select information card 422 and provides it the client device 110. The information card 422 may be outputted in a searching context (e.g., on a search page where a user provides a search query). Upon receiving a user input associated with the information card 422, the user may be directed to the application 112.

In stage (E), the application 410 may causes the client device 110 to display the information card 422 on user interface 432. In FIG. 4, the information card 422 may be presented as a display 432A on the user interface 432 as a search result that is determined to be responsive to the search query 402 received in stage (A). The user interface 432 may be an interface that is presented through the operating system of the client device, e.g., a search page that allows the user to access a built-in operating system search engine, or an interface that is presented through the application 410, e.g., as a search interface that allows the user to access an application-specific search engine that allow searches relevant application data.

Figure 5:
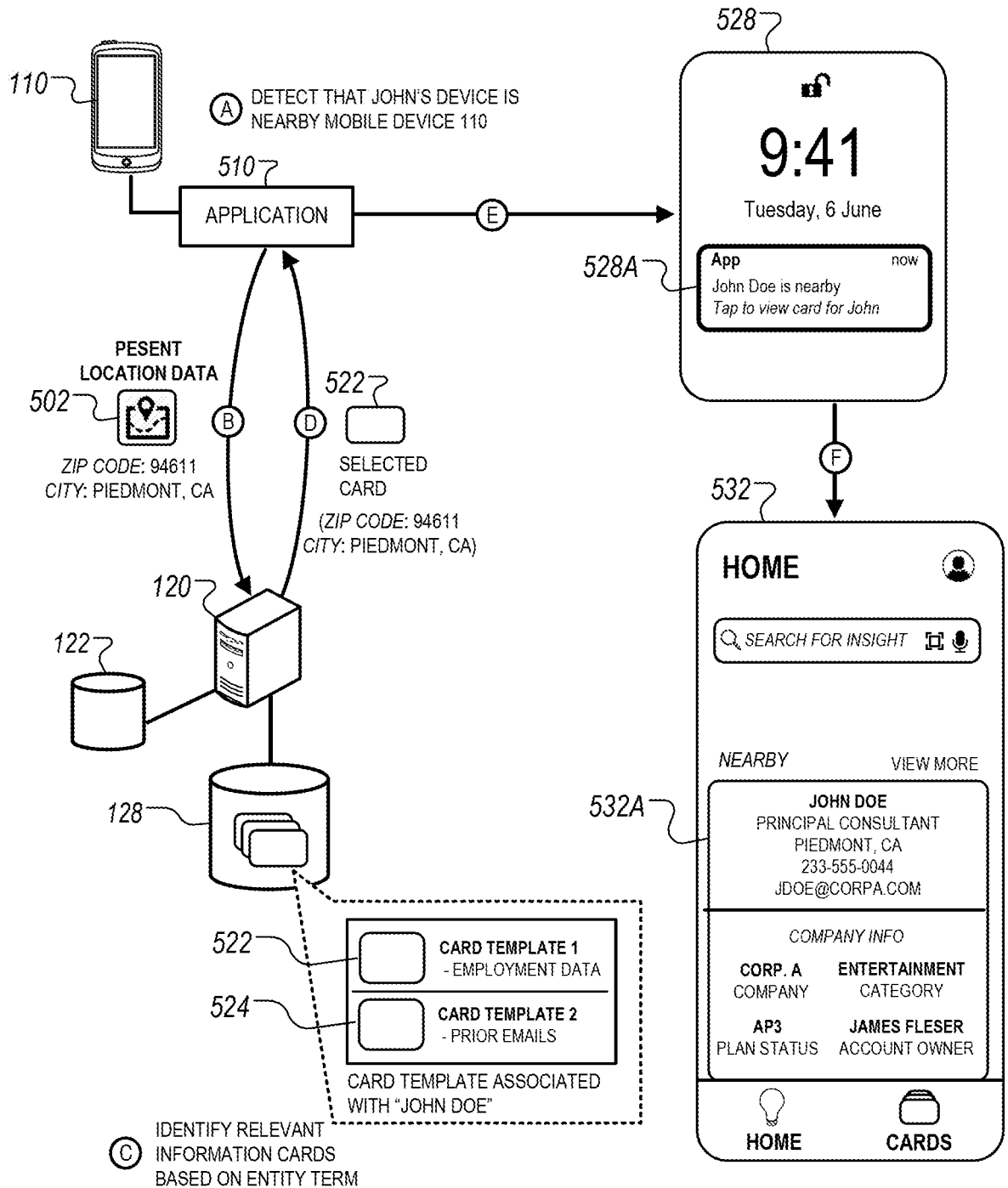
FIG. 5 illustrates an example of a technique for displaying information cards based on monitoring location data.

FIG. 5 illustrates an example of a technique for displaying information cards based on monitoring location data. In this example, an information card may be presented on the client device 110 once the client device 110 is detected at a location nearby a point of interest associated with the information card.

In stage (A), an application 510 may monitor location data 502 of the client device 110 and determine the client device 110 is presently located nearby a point of interest associated with information cards. In FIG. 5, the application 510 may determine that the client device 110 is located nearby a known device of an entity "John." The application 510 may determine that John's device is associated with information cards that are stored in the card database 128. In stage (B), the application 510 may provide the location data 502 to the server 120.

In stage (C), the server 120 may identify information cards in the card database 128 that are relevant to the entity of the device detected nearby the present location of the client device 110. The server 120 may identify the relevant information cards by using the entity term as a search index to identify information cards that, for example, include the entity term itself or include information corresponding to the entity. In FIG. 5, the server 120 may identify two relevant information cards 522 and 524 that are each associated with the entity "JOHN" and include different types of information for the entity. Information card 522 may include information relating to John's employment data, while information card 524 may include information relating to prior emails John sent to the user. In stage (D), the server 120 may select information card 522 and provide the information card 522 the client device 110.

In stage (E), the application 510 may cause the client device 110 to display a notification 528A on user interface 528 of the client device 110. In FIG. 5, the user interface 528 may represent a lock screen where system notifications may be displayed to a user before he/she logs into the client device 110. The notification 528A may be handled by the operating system of the client device 110 and configured to prevent sensitive information of the information card 522 to be displayed on the user interface 528. For example, notification 528A may identify that a card is available for access on the client device 110 and that John is nearby the location of the client device 110 without actually displaying John's employment data that is included in the card. A user may interact with the notification 528A and log into the client device 110 to access the sensitive information that is actually included in the information card 522.

In stage (F), the client device 110 may present a display 532A of the information card 522, once a user interacts with the notification 528A, e.g., by providing an input selecting the notification 528A. The display 532A may be presented through a user interface 532 of the application 510. For example, once the user interacts with the notification 528A, the client device 110 may be configured to launch the application 510 and present the display 532A through the application 510. Alternatively, in other instances, the client device 110 may present the display 532A as a pop-up window that runs in the operating system of the client device 110 and without launching the application 510.

In some implementations, the application 510 may adjust the display of the information card 522 on the client device 110 based on the monitored location data for the client device 110 after presenting the display 532A. For example, the application 510 may configure the client device 110 to only display the information card 522 while the location data 502 indicates that the client device 110 is within a threshold proximity to John's device, e.g., 100 meters. If the client device 110 moves away from John's device and is no longer within the threshold proximity, then the application 150 may configure the client device 110 to remove the notification 528A and/or the display 532A since they are no longer relevant to the present location of the client device 110. In this manner, the application 510 may dynamically monitor location data to determine if other more relevant information cards should be presented on the client device 110 based on the location of the client device 110.

The location monitoring techniques depicted in FIG. 5 may be performed using other types of information sources. In some implementations, connection events between the client device 110 and beacons placed in specified locations may be monitored and used in addition to, or in lieu of, the location data 502, to output information cards on the client device 110. For example, a beacon placed in a specified location may be associated with a set of information cards of entities associated with the specified location. Once a connection event has occurred between the client device and the beacon (e.g., the client device 110 detecting beacon data transmitted or broadcasted by the beacon), the application 510 may output one or more information cards that are included in the set of information cards. In this example, the application 510 may monitor for the presence of the beacon and uses detected connection events to determine that the user is nearby the specified location associated with the beacon.

Figure 6:
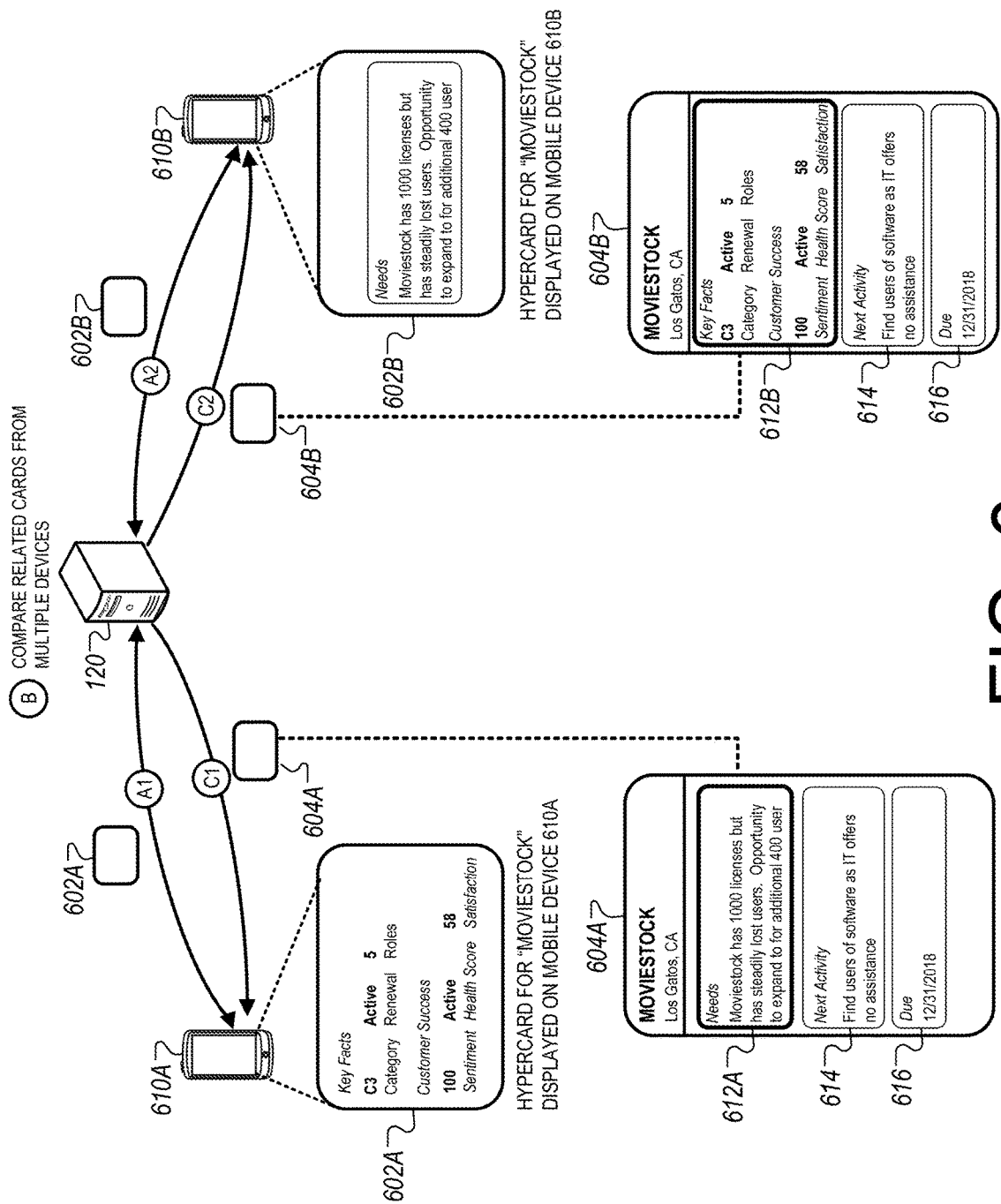
FIG. 6 illustrates an example of a technique for dynamically generating information cards for multiple users.

FIG. 6 illustrates an example of a technique for dynamically generating information cards for multiple users. In this example, users of two client devices 610A and 610B may be provided with different information cards relating to the same entity and the server 120 may evaluate the information cards to see if the users would benefit from being provided with information cards with additional entity information not included in the previously provided information cards.

In stages (A1) and (A2), the server 120 may provide information card 602A to client device 610A and information card 602B to client device 610B. The information cards 602A and 602B may include different subsets of information for the same entity "MOVIESTOCK." Information card 602A may include information relating to key facts for the entity, whereas information card 602B may include information relating to needs of the entity. The information cards 602A and 602B may include different subsets of information because they may have been provided by the server 120 based on different actions or trigger conditions being detected at the client devices 610A and 610B. For example, the information card 602A may have been provided to the client device 610A based on a search query for key facts received at the client device 610A, whereas the information card 602B may have been provided to the client device 610B based on an upcoming calendar appointment with a representative from "Moviestock" to discuss business opportunities.

In stage (B), the server 120 may compare information cards 602A and 602B that were previously provided to client device 610A and 610B and determine whether there are any differences in the information that they include. The server 120 may compare information fields included in each of the information cards, and values for corresponding information fields, e.g., characters, values, to determine the information that is not included in each card, the information that is included in both cards, or information that varies between the two cards.

In stage (C), the server 120 may generate additional cards based on the comparison and provide additional cards to each client device. In FIG. 6, the server 120 may provide information card 604A to client device 610A and provide information card 604B to client device 610B. The information cards 604A and 604B each may include additional information not previously included in information cards 602A and 602B. Specifically, the information card 602A may include a field 612A that includes needs of the entity that was not included in the information card 602A but was included in the information card 602B. In the same fashion, the information card 602B may include a field 6126 that includes key facts of the entity that was not included in the information card 602B but was included in the information card 602A. The information cards 604A and 604B therefore may provide supplemental entity information that the server 120 determines may be of interest to a user based on related cards provided to other users. The information cards 604A and 604B also may include fields 614 and 616 that were not included in either of the information cards 604A and 604B. The fields 614 and 616 may include entity information that was added to the source database 122 after the information cards 602A and 602B were generated that the server 120 determines may be of interest to users based on the prior information cards provided to client devices 610A and 610B.

Figure 9A:
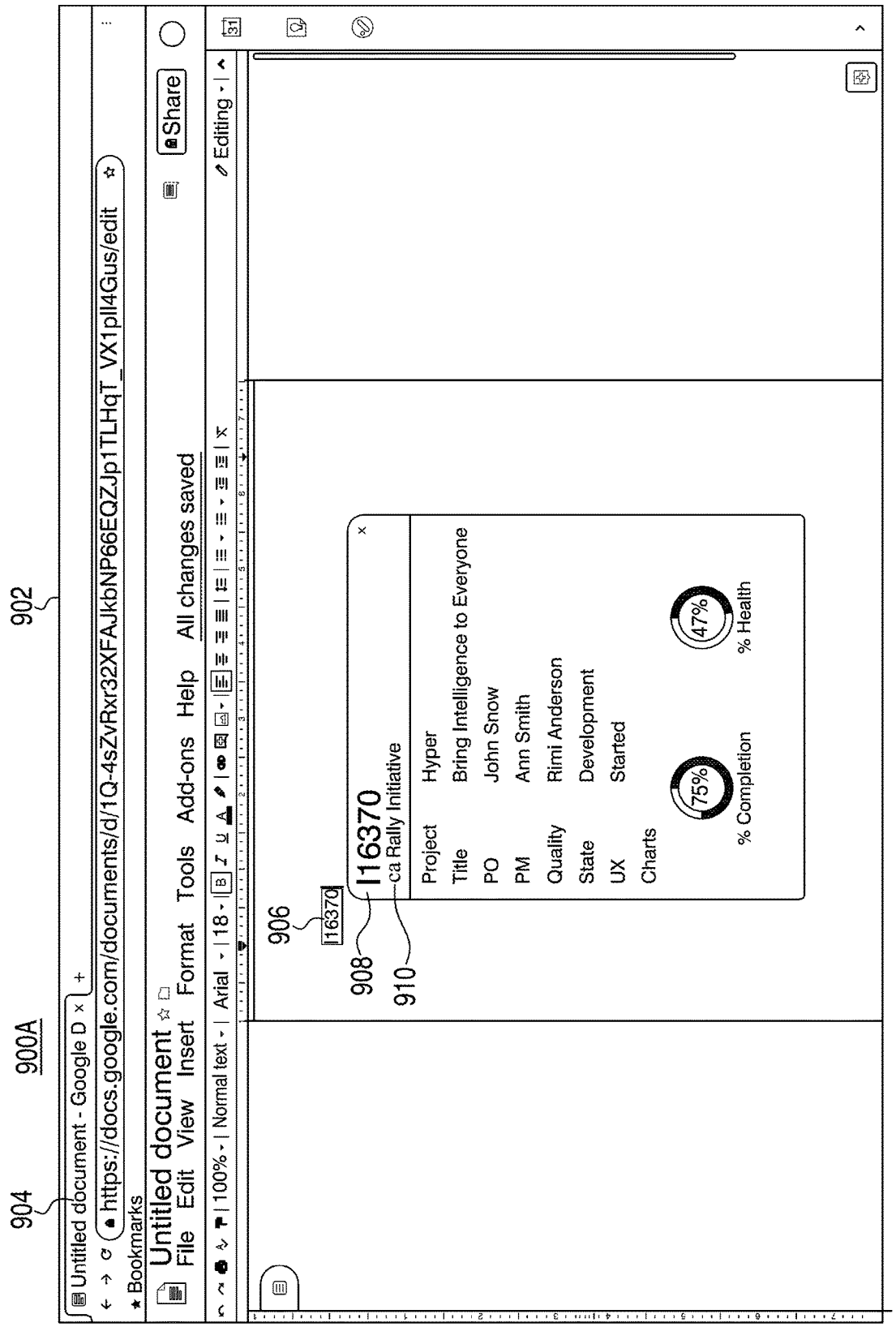

In one aspect of the disclosure, the information cards (e.g., information card 908 of FIG. 9A) may include a link (e.g., displayed as a link element 910 of FIG. 9A). Generally, the link may be a dynamic link or a static link, as defined in a card template. The link, when executed by a client device, may launch an application on the client device, or may launch a web page (e.g., on a mobile web browser) on the client device. Generally, the displaying of information cards that include a link may be referred to as a link display process. The link display process generally follows the examples discussed above with respect to FIGS. 1-6, however the link display process also includes processes to generate an information card that includes the link, and processes to execute a link process to launch an application on the client device or launch a web page (e.g., on a mobile web browser) on the client device.

Figure 7:
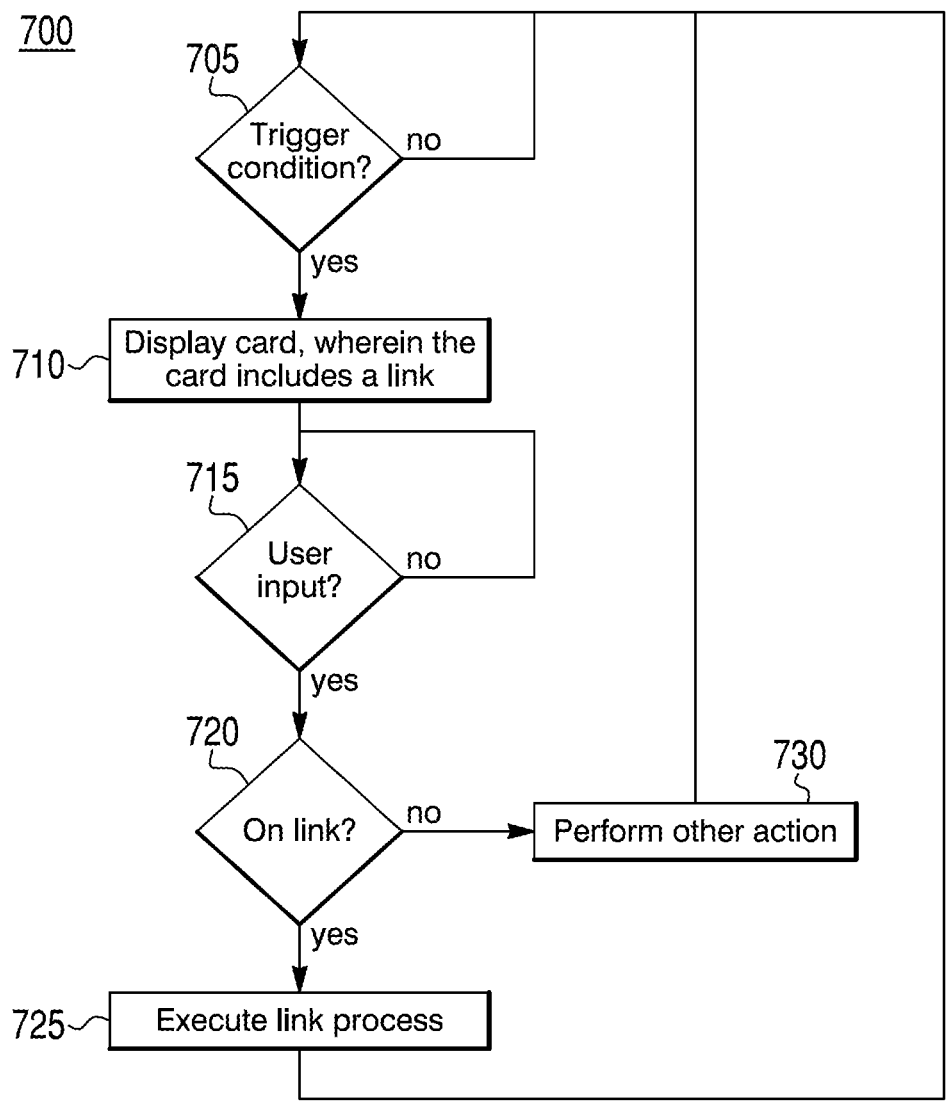
FIG. 7 depicts a flowchart for a link display process, according to one or more embodiments.

As an illustrative example, the client device 110 may execute a process of a flowchart 700 depicted in FIG. 7 to display an information card that includes a link. FIG. 7 depicts a flowchart for a link display process, according to one or more embodiments. The flowchart 700 may be performed by, e.g., the application 112 on the client device 110, as discussed above. The application 112 may start the process of the flowchart 700 by determining whether a trigger condition is present (block 705). For instance, the application 112 may monitor activity on the client device 110 to detect satisfaction of a trigger condition that specifies display of an information card on the client device 110, as discussed above in FIGS. 1-6.

In response to determining that the trigger condition is not present (block 705: No), the application 112 may proceed to wait until the trigger condition is present (block 705). In response to determining that the trigger condition is present (block 705: Yes), the application 112 may proceed to display an information card (block 710).

For instance, the application 112 may transmit a card request 102 to the server 120, as discussed above in FIGS. 1-6. In response to receiving the card request 102, the server 120 may access the source database 122 and generate one or more information cards that are to be provided to the client device 110 in response to the card request 102, as discussed above in FIGS. 1-6. The server 120 may transmit the one or more information cards for presentation on the client device 110. In response to receiving the information card 104 from the server 120, the client device 110 may present the one or more information cards for display on a user interface 126B, as discussed above in FIGS. 1-6.

Generally, the server 120 may select a card template from among the card templates 124, based on the term(s) identified as corresponding to an entity, or an indication of the entity determined to be relevant to the current context identifier for the user 101 and/or the client device 110, and/or an identifier for the user 101 and/or the client device 110. The server 120 may then access the source database 122 to retrieve data, in accordance with the selected card template. The server 120 may then populate an information card with the retrieved data to generate the information card.

Generally, the card templates may or may not include a link, set by an author of the card template. The card templates may or may not include a link based on identifier for the user 101, so that users of different classifications with different levels of access to information about an entity or different roles within an organization may or may not have a link in an information card generated based on the card template. For instance, a first user with a higher access level than a second user may receive an information card that includes a link to a data application that contains secured information, while the second user may not receive an information card that includes the link to the data application. Meanwhile, a third user (e.g., the second user or someone else) may have a maintenance-related role within the organization and the third user may receive an information card that includes a link to a maintenance application.

In the case that the selected card template is set to include a link, the server 120 may obtain link information for the selected card template. The link information may be stored in the card template or in association thereto. The link information may include display information on how a link may be displayed. The display information may indicate format and structure of the link on the card, such as location and orientation of graphic(s), if any, for the link and/or text, if any, for the link. The display information may be set by the author, as discussed below with respect to FIGS. 8A-8E. The link information may also include address information. The address information may include a text string that, when executed by a client device, launches an application on the client device or launches a web page (e.g., on a mobile web browser) on the client device. For instance, the web page may be the intended end point of the address information, or the web page may be a redirect point to launch the application. In the case that the web page is redirect point, the web browser/client device 110 may then redirect to the application, in accordance with, e.g., deep linking. The address information may be set by the author, as discussed below with respect to FIGS. 8A-8E.

Figure 8A:
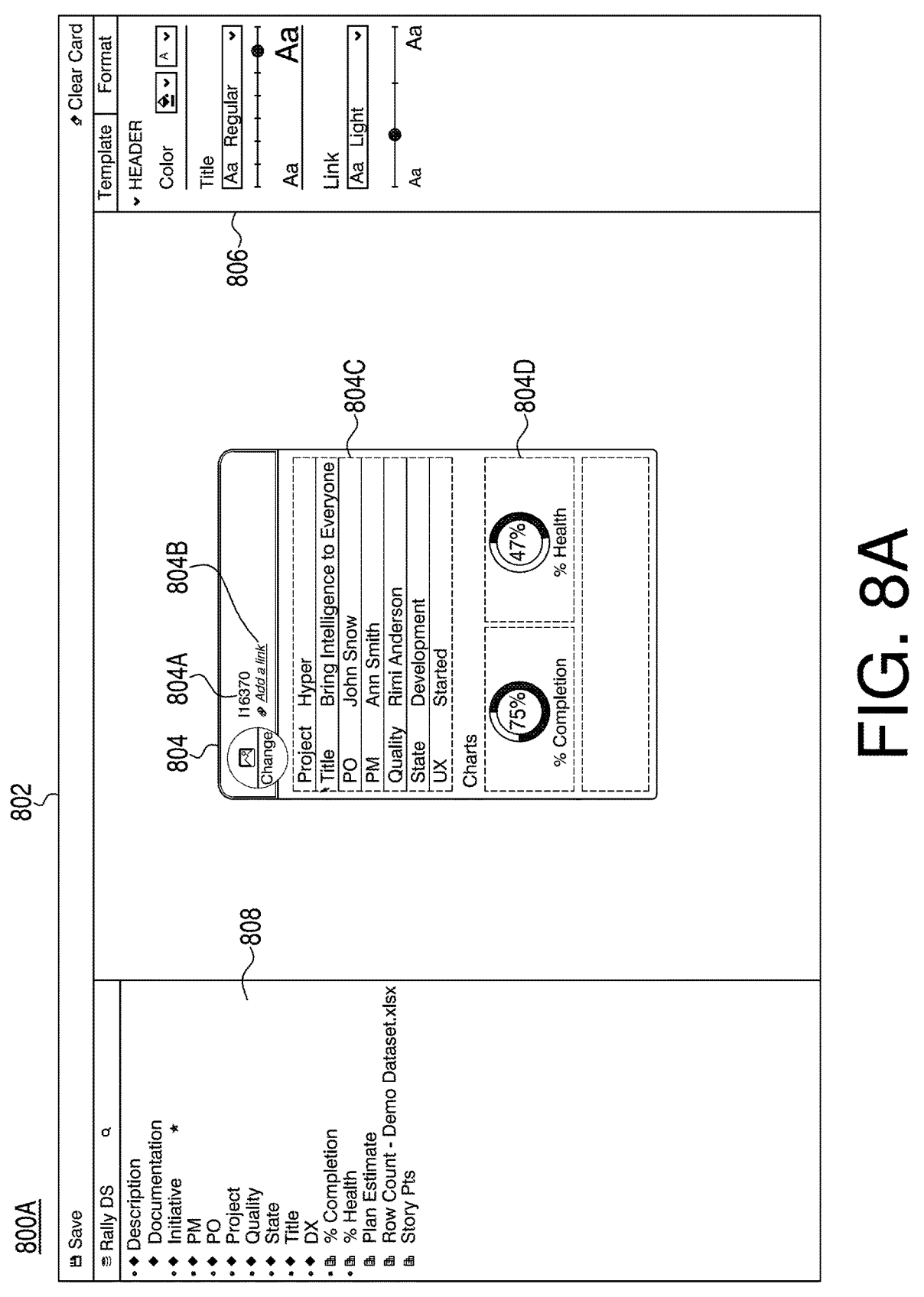

For a dynamic link, the text string of the address information may include a base portion and a parameter portion (such as base portion 812 and parameter portion 820 of FIGS. 8C and 8E). The base portion may be static (i.e., remains the same), while the parameter portion may be dynamic, so that the server 120 may retrieve a data element (e.g., an identifier, a key parameter, etc.) from the source database 122 in accordance with a data element pointer, and populate the parameter portion to complete the text string, when the server 120 is generating an information card that includes a dynamic link. For a static link, the text string of the address information may be comprised entirely of a base portion.

The client device 110 may display the one or more information cards and, for the one or more information cards that include link information, the client device 110 may display a link element, in accordance with the link information, in the one or more information cards that include link information. The link element may be selectable by a user input to execute a link process.

Returning to FIG. 7, the application 112 may then proceed to determine whether a user input is received (block 715). In response to determining that the user input is not received (block 715: No), the application 112 may proceed to wait until the user input is received (block 715). In response to determining that the user input is received (block 715: Yes), the application 112 may proceed to determine whether the user input is on the link element of the information card (block 720). For instance, the application 112 may determine that a user input (e.g., a touch input, a click, etc.) selects the link element of a displayed information card. One of skill in the art would recognize that the selection of link element may also be in various other forms, such as a voice input selecting the link element, so the user input may not necessarily be on the link element but may select the link element in a different manner.

In response to determining that the user input is not on the link element of the information card (block 720: No), the application 112 may perform another action that corresponds to the user input (block 730). For instance, the application 112 may close the information card, display additional information of the information card, etc., in accordance with the user input on other card elements being displayed. The application 112 may then proceed to determine whether a trigger condition is present (block 705).

In response to determining that the user input is on the link element of the information card (block 720: Yes), the application 112 may proceed to execute a link process (block 725). For instance, the application 112 may obtain the link information associated with the link element, extract the address information from the link information, and execute a link launch process using the address information.

The link launch process may launch an application on the client device or launch a web page (e.g., on a mobile web browser) on the client device, in accordance with the address information. Generally, in the case of a static link, the link launch process may: (1) open an already installed application on the client device (e.g., main menu of the application), (2) open a web page in a web browser, and/or (3) open a download application to download the application, with or without opening the application after the application has been downloaded. In the case of a dynamic link, the link launch process may: (1) open an application to a particular feature or function of the application, corresponding to the data element of the parameter portion of the address information, (2) open a web page in a web browser to a particular resource, corresponding to the data element of the parameter portion of the address information, (3) open a download application to download the application, with or without opening the application after the application has been downloaded to the particular feature or function of the application, and/or (4) open a web page, a web page of a search engine, or open a search engine application and execute a search using the data element of the parameter portion of the address information. For instance, the link launch process may execute the text string of the address information as an uniform resource locator (URL) in a web browser to access the web page, or the link launch process may execute the text string of the address information as a file path to open the application on the client device 110. The application may interpret the parameter portion of the text string (e.g., in accordance with an application programing interface) to open the particular feature/particular function/particular resource. The particular feature/particular function/particular resource may correspond to the entity of the information card. As an illustrative example, in the case of a machine as an entity, the information card may display relevant information for the entity, and the link element of the information card may be a link to the machine within a maintenance application.

Returning to FIG. 7, the application 112 may then proceed to determine whether a trigger condition is present (block 705).

As a result, a user of the application 112 of the present disclosure may access relevant information and/or applications that are contextually relevant without additional navigation. For instance, a user may avoid searching for the information or searching for a relevant application to open and navigate therein. Instead, the application 112 of the present disclosure may provide a link directly to the information (e.g., on a webpage) or to an application (in general, or to a particular portion or function). In the case of the particular portion or function of the application, the user may only select the link element to be brought to a contextually relevant aspect of the application, such as a particular user interface of an application that may be associated with an entity that triggered the information card to be displayed. Therefore, the user may avoid searching within applications to find the particular portion of the application that is associated with the entity.

Generally, the applications/webpages the links may launch may correspond to publicly available applications, publicly available webpages/search engines, proprietary applications, such as enterprise applications, and/or proprietary webpages (e.g., within an enterprise network that is not publicly accessible). For instance, as illustrative examples in a non-exhaustive manner, the applications (and web pages for) may correspond to: data analytics applications, sales applications, maintenance applications, supply chain applications, store applications, clienting applications, human resource applications, etc.

Figure 8B:
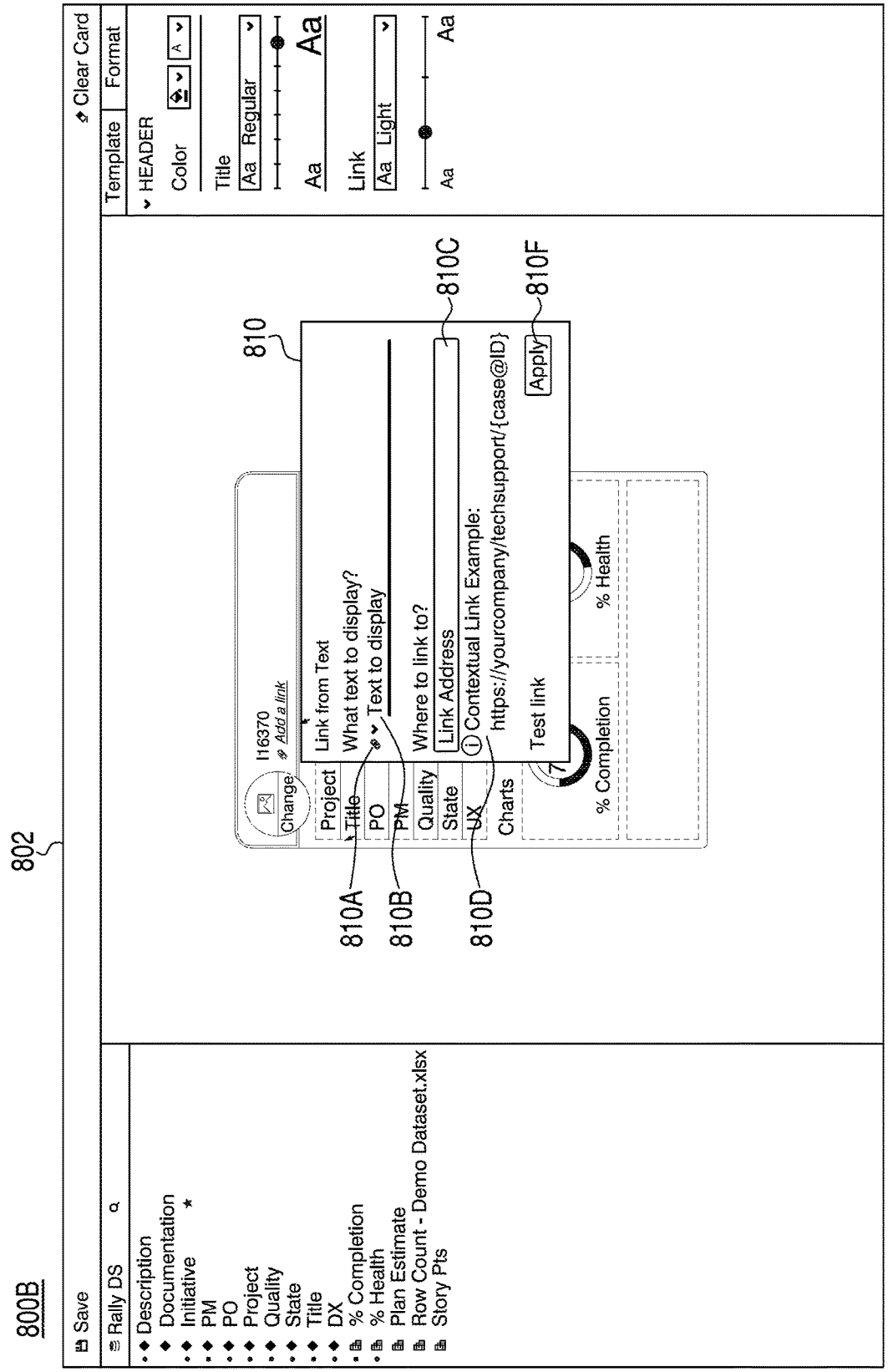
Figure 8C:
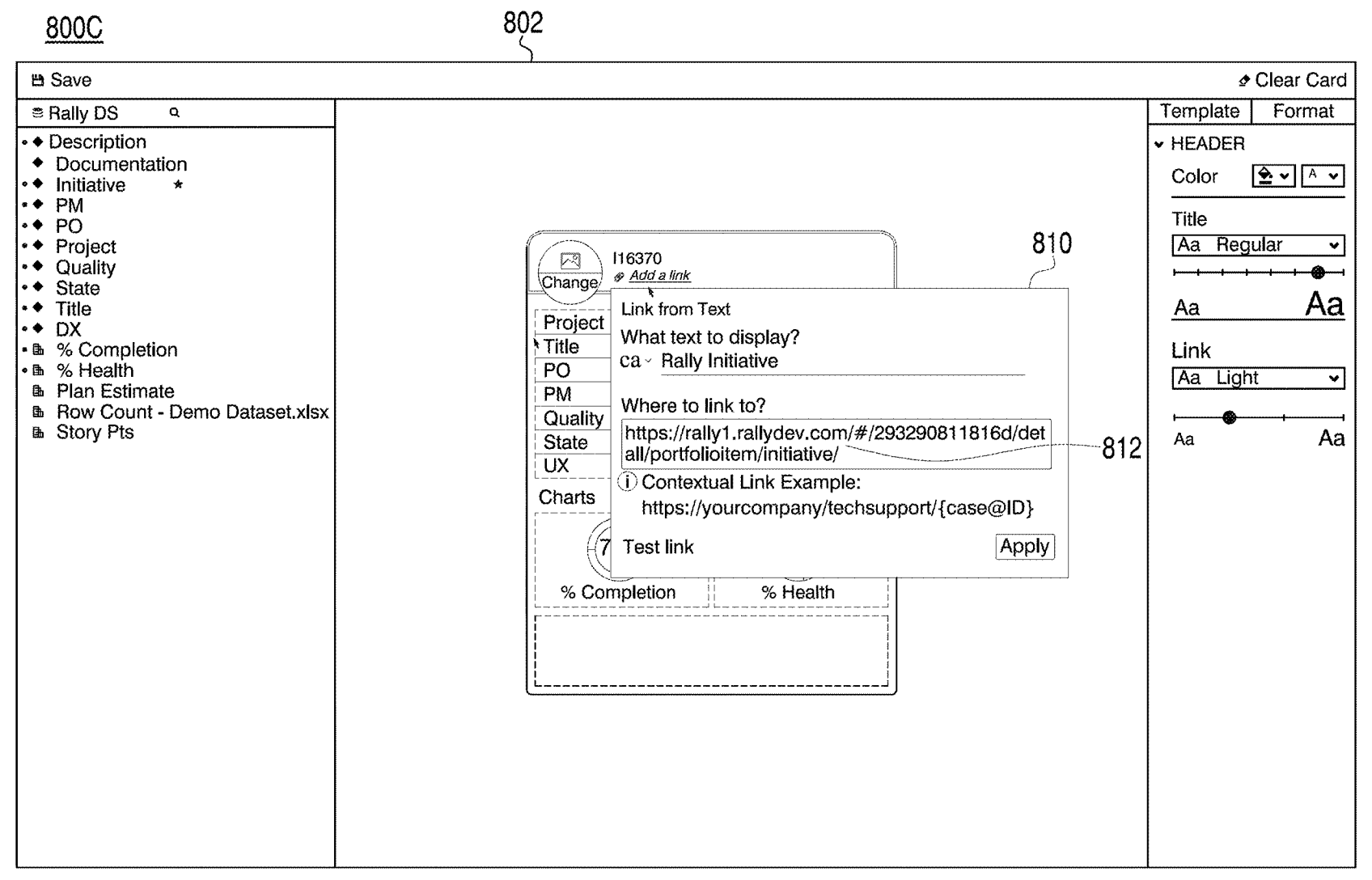
Figure 8D:
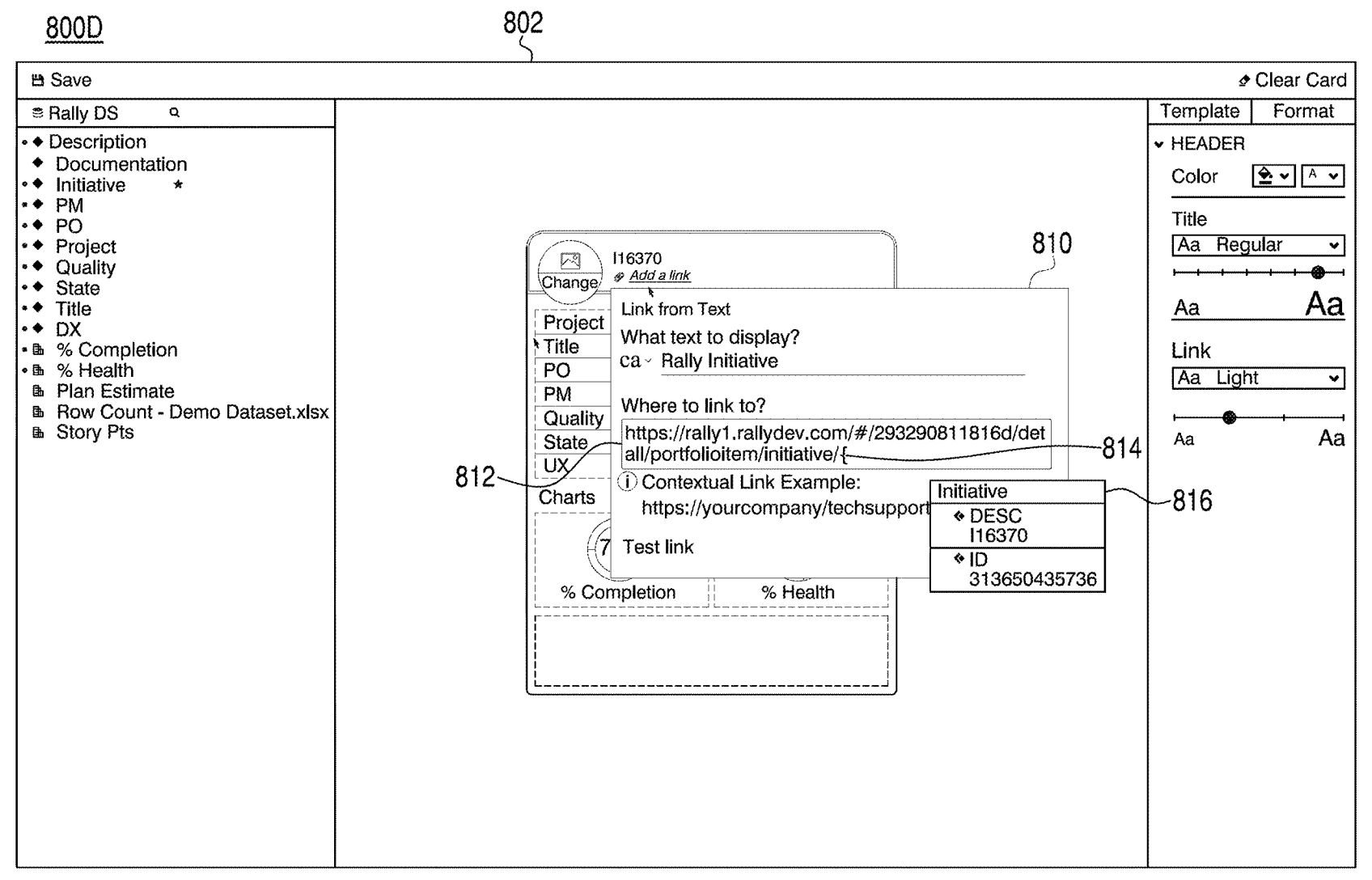
Figure 8E:
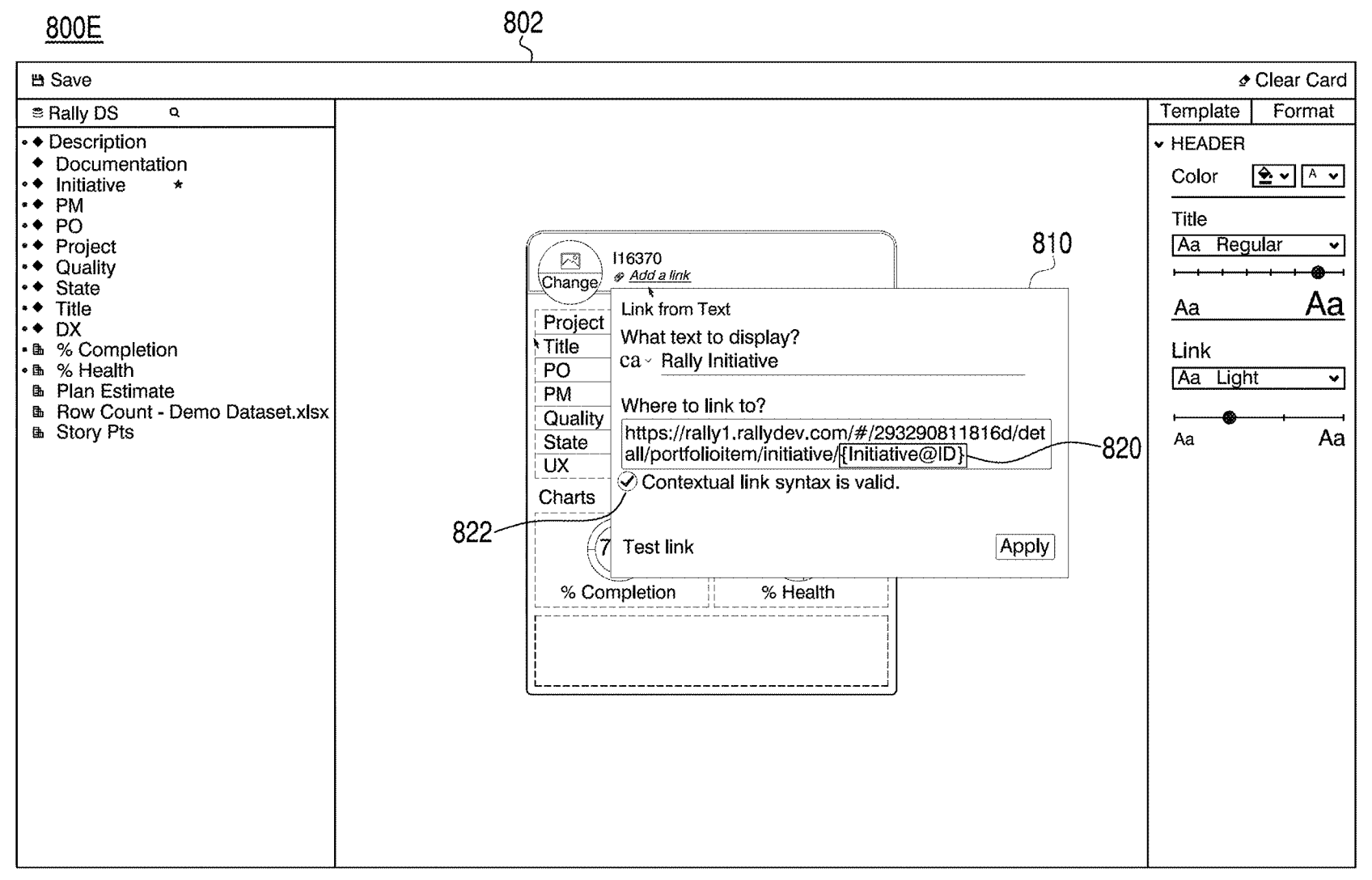

FIGS. 8A-8E depict exemplary graphical user interfaces (GUIs) for authoring an information card that includes at least one link for a link display process, according to one or more embodiments. In FIG. 8A, GUI 800A may depict an authoring interface 802 of authoring application. The authoring interface 802 may allow a user of the authoring application to generate card templates. The authoring application may be executed on a client device, such as client device 110. The authoring interface 802 may allow an author (e.g., a user of the authoring application) to select/generate a template 804 for a card template, using formatting tools 806 and data set links 808 to populate data element pointers to specific data elements of information in the source data base 122. For instance, template 804 may have a header 804A, and one or more data portions 804C/804D. The one or more data portions 804C/804D may be configured using the formatting tools 806 and may contain static information (e.g., entered by the user) and dynamic data, set by the data element pointers using the data set links 808, as set by the author. The header 804A may include text or images, as set by the author, and an link add element 804B to include a link element for the template 804. When a link element is included in the template 804, the template 804 (when deployed to users of the application 112/server 120) may perform as discussed above.

In FIG. 8B, GUI 800B may depict a link add menu 810 in response to a user input on the link add element 804B. The link add menu 810 may include a graphic element 810A, a display text element 810B, a link address input field 810C, an example link 810D, a test element 810E, and/or an apply element 810F. The graphic element 810A may be selectable by the author to include a graphic element for the link element, as a part of the display information. The graphic element may be selected from among standard graphics or based on author graphics provided to the authoring application. The display text element 810B may be selectable by the author to input text for displaying in the link element, as a part of the display information. The link address input field 810C may be selectable by the author to input text for the text string of the address information. The example link 810D may a text string that has valid syntax to execute as a link (e.g., dynamically or statically). The test element 810E may be selectable by the author to test a current text string in the link address input field 810C, for instance the authoring application may applying syntax rules to the current text string to determine whether the current text string has valid syntax or not. The apply element 810F may be selectable by the author to save the configured link element as a part of the template 804. The apply element 810F may be selectable only if the current text string in the link address input field 810C has valid syntax.

In FIG. 8C, GUI 800C may depict current text string in the link address input field 810C in response to a user input inputting the current text string (e.g., typing or copy and paste, etc.) into the link address input field 810C. In this case, the current text string may be a base portion 812. Using on the syntax rules, the authoring application may dynamically determine whether the current text string in the link address input field 810C (as it changes) has valid syntax and whether the current text string is forming a static of dynamic link.

In FIG. 8D, GUI 800D may depict a trigger text element 814 that indicates the author is forming a dynamic link. For instance, the trigger text element may be a first text (or portion of) a parameter portion. The authoring application may determine whether the trigger text element 814 is present (e.g., by matching defined text using regular expression processing to the current text string in the link address input field 810C). In response to determining the trigger text element 814 is present, the authoring application may display a parameter menu 816 for likely parameter portions. The parameter menu 816 may include one or more data element pointers of the data set links 808 based on context. For instance, the authoring application may determine the current text string has a word/term/URL that could have a parameter portion that corresponds to one of the data element pointers, and suggest the one of the data element pointers. The one or more data element pointers of the parameter menu 816 may be selectable by the author to auto-complete the current text string.

In FIG. 8E, GUI 800E may depict an auto-completed current string with the parameter portion 820 automatically entered by the authoring application, in response to a user input selecting one of the one or more data element pointers of the parameter menu 816. Moreover, the authoring application may display a syntax valid indicator 822, if the authoring application, using the syntax rules, determines the current text string has valid syntax. For instance, the syntax valid indicator 822 may replace the example link 810D. The author may select the apply element 810F to save the configured link element.

The author may save the template 804, with the saved configured link element. The author may make the template 804 available to the server 120 and/or the client device, such as client device 110, to allow the template 804 to be used as a card template among the card templates 124 for use in association with one or more entities. As the link element of the template 804 may be dynamic, the link element for the one or more entities may be dynamically generated when an information card is generated for an entity, by accessing a data element pointer for that entity.

Figure 9B:
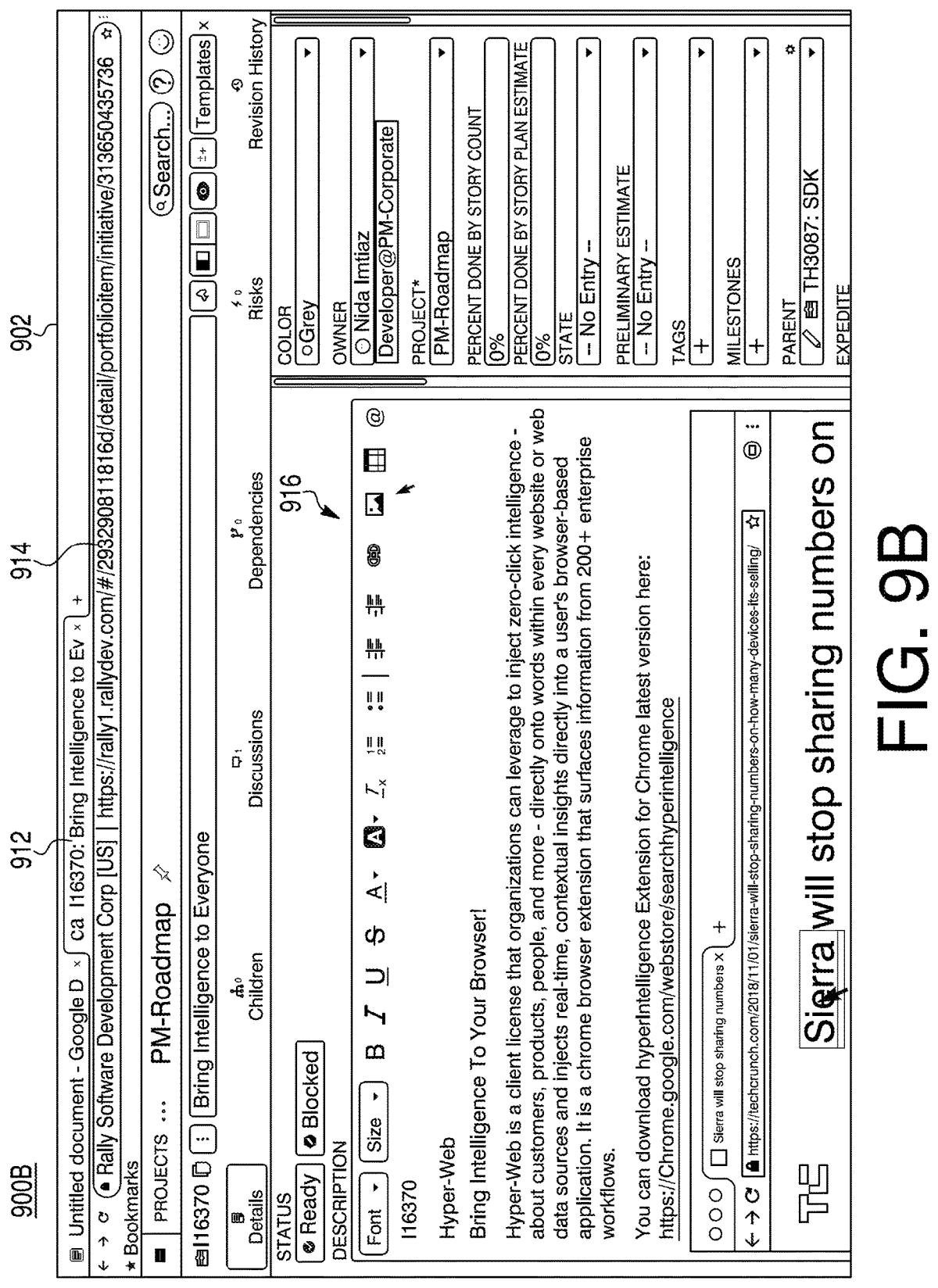

FIGS. 9A-9B depict graphical user interfaces (GUIs) for displaying an information card that includes a link for a link display process, according to one or more embodiments. In FIG. 9A, GUI 900A may depict an application interface 902 for an application (e.g., a mobile browser) on a client device, such as the client device 110. The application 112 of the client device 112 may determine that within the window 904 of the application interface 902 a term 906 satisfies a trigger condition, and executes the link display process, as discussed above. In response to receiving an information card 908 that corresponds to the term 906, the application 112 may display the information card 908. The information card 908 may include a link element 910. The link element 910 may correspond to the link element saved in in the authoring process described above.

In FIG. 9B, GUI 900B may depict a linked window 912, in response to a user input selecting the link element 910 of the GUI 900A, in accordance with the link display process. The linked window 912 may have an address 914 that corresponds to the base portion 812 and the parameter portion 820, as dynamically generated for the information card 908. In this example, the linked window 912 is a web page in a mobile browser that is for a particular resource that corresponds to the parameter portion 820, as dynamically generated for the information card 908. In the linked window 912, relevant information 916 may be displayed for the particular resource.

In another aspect of the disclosure, the link element might not be included in the header of an information card. Instead, or additionally, the link element may be in the one or more data portions 804C/804D of an information card. In this case, the displayed information in the one or more data portions 804C/804D may include static or dynamic data from the source database 122, and/or a link element. The displayed information/link element may be selectable by a user in a similar manner as to the static or dynamic links above in the link display process. The address information for this link element may be retrieved by the server 120 from the source database 122 as a data element.

Implementations of the concepts disclosed herein and all of the functional operations described in this specification may be implemented in digital electronic circuitry, or in computer software, firmware, or hardware, including the structures disclosed in this specification and their structural equivalents, or in combinations of one or more of them. Implementations of the invention may be implemented as one or more computer program products, i.e., one or more modules of computer program instructions encoded on a computer-readable medium for execution by, or to control the operation of, data processing apparatus. The computer readable medium may be a non-transitory computer readable storage medium, a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, Implementations of the invention may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Implementations of the invention may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the invention, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular Implementations of the invention. Certain features that are described in this specification in the context of separate Implementations may also be implemented in combination in a single implementation. Conversely, various features that are described in the context of a single implementation may also be implemented in multiple Implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the Implementations described above should not be understood as requiring such separation in all Implementations, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular Implementations of the invention have been described. Other Implementations are within the scope of the following claims. For example, the actions recited in the claims may be performed in a different order and still achieve desirable results.

What is claimed is:

1. A method for displaying contextually relevant links, the method comprising:
   receiving calendar data from a calendar database, the calendar data associated with an upcoming calendar event;
   monitoring to detect a keyword, from a database of keywords, in the calendar data;
   in response to detecting the keyword, identifying a particular company associated with the detected keyword;
   obtaining usage data collected by an operating system of a client device;
   determining, based on the collected usage data, a predicted time when a user will access, using a user interface, a term relevant to the particular company;
   determining an access privilege, associated with the company, that is assigned to the user;
   in response to determining the predicted time, obtaining data for an information card based on the calendar data, the particular company, and the access privilege assigned to the user, from an entity database associated with the company, including information related to the particular company and a link element, the link element comprising a static portion and a dynamic portion, wherein the dynamic portion of the link element is specific to the particular company;
   displaying, at the predicted time, the information card or an interactive control configured to initiate display of the information card;
   when the information card is displayed, displaying the link element in the information card;
   determining that a user input of the user selects the link element; and
   in response to determining the user input selects the link element, executing a link process.

2. The method of claim 1, wherein the executing the link process includes:
   obtaining link information from the information card;
   extracting address information from the link information; and
   executing a link launch process to launch an application on the client device or launch a web page on the client device, in accordance with the address information.

3. The method of claim 2, wherein the executing the link launch process comprises: extracting a text string form the address information; and performing one of:
   executing the text string as a uniform resource locator (URL) in a web browser of the client device to access a web page corresponding to the URL, or
   executing the text string as a file path to open the application on the client device.

4. The method of claim 3, wherein the address information comprises a static or a dynamic link.

5. The method of claim 4, wherein, when the address information comprises the static link, the link launch process opens the application on the client device, opens the web page in the web browser, or opens a download application to download the application.

6. The method of claim 4, wherein the text string of the address information includes a data element of a parameter portion of the text string, and further comprising:
   upon determining that the address information is for the dynamic portion of the link, opening, by the link launch process, the application to a particular feature or function of the application corresponding to the data element of the parameter portion of the address information;
   opening the web page in the web browser to a particular resource corresponding to the data element of the parameter portion of the address information;
   opening a download application to download the application and opening the application after the application has been downloaded to the particular feature or function of the application; or
   executing a search using the data element of the parameter portion of the address information in the web page, a search web page of a search engine, or a search engine application.

7. The method of claim 6, wherein the obtaining the data for the information card includes transmitting a card request to a server,
   wherein the server, upon receiving the card request:
   selects a template for the information card, from a card database, from among a plurality of templates that each specify a different format for the information card, wherein the template is selected based on the calendar data and the particular entity;
   generates the information card based on stored data in a source database for the information card including information related to the particular entity and the template selected for the information card; and
   transmits the generated information card to the client device; and
   wherein the server generates the address information for the information card by:
   retrieving the data element from the source database in accordance with a data element pointer, and
   populating the parameter portion to complete the text string.

8. A client device for displaying contextually relevant links, the client device comprising:
   at least one memory storing instructions; and
   at least one processor executing the instructions to perform operations comprising:
   receiving calendar data from a calendar database, the calendar data associated with an upcoming calendar event;
   monitoring to detect a keyword, from a database of keywords, in the calendar data;
   in response to detecting the keyword, identifying a particular company associated with the detected keyword;
   obtaining usage data collected by an operating system of a client device;
   determining, based on the collected usage data, a predicted time when a user will access, using a user interface, a term relevant to the particular company;
   determining an access privilege, associated with the company, that is assigned to the user;
   in response to determining the predicted time, obtaining data for an information card based on the calendar data, the particular company, and the access privilege assigned to the user, from an entity database associated with the company, including information related to the particular company and a link element, the link element comprising a static portion and a dynamic portion, wherein the dynamic portion of the link element is specific to the particular company;

displaying, at the predicted time, the information card or an interactive control configured to initiate display of the information card;

when the information card is displayed, displaying the link element in the information card;

determining that a user input of the user selects the link element; and in response to determining the user input selects the link element, executing a link process.

9. The client device of claim 8, wherein the operations further comprise, to execute the link process:

obtaining link information from the information card;

extracting address information from the link information; and executing a link launch process to launch an application on the client device or launch a web page on the client device, in accordance with the address information.

10. The client device of claim 9, wherein the operations further comprise, to execute the link launch process: extracting a text string form the address information; and performing one of:

executing the text string as a uniform resource locator (URL) in a web browser of the client device to access a web page corresponding to the URL, or executing the text string as a file path to open the application on the client device.

11. The client device of claim 10, wherein the address information comprises a static or a dynamic link.

12. The client device of claim 11, wherein, when the address information comprises the static link, the link launch process opens the application on the client device, opens the web page in the web browser, or opens a download application to download the application.

13. The client device of claim 11, wherein the text string of the address information includes a data element of a parameter portion of the text string, and the process further comprises:

upon determining that the address information is for the dynamic portion of the link, opening, by the link launch process, the application to a particular feature or function of the application corresponding to the data element of the parameter portion of the address information;

opening the web page in the web browser to a particular resource corresponding to the data element of the parameter portion of the address information;

opening a download application to download the application and opening the application after the application has been downloaded to the particular feature or function of the application; or executing a search using the data element of the parameter portion of the address information in the web page, a search web page of a search engine, or a search engine application.

14. The client device of claim 13, wherein the operations further comprise, to obtain the data for the information card, transmitting a card request to a server, wherein the server, upon receiving the card request:

selects a template for the information card, from a card database, from among a plurality of templates that each specify a different format for the information card, wherein the template is selected based on the calendar data and the particular entity;

generates the information card based on stored data in a source database for the information card including information related to the particular entity and the template selected for the information card; and transmits the generated information card to the client device; and wherein the server generates the address information for the information card by:

retrieving the data element from the source database in accordance with a data element pointer, and populating the parameter portion to complete the text string.

15. A non-transitory computer-readable medium storing instructions that, when executed by a processor, cause the processor to perform operations for displaying contextually relevant links, the operations comprising:

receiving calendar data from a calendar database, the calendar data associated with an upcoming calendar event;

monitoring to detect a keyword, from a database of keywords, in the calendar data;

in response to detecting the keyword, identifying a particular company associated with the detected keyword;

obtaining usage data collected by an operating system of a client device;

determining, based on the collected usage data, a predicted time when a user will access, using a user interface, a term relevant to the particular company;

determining an access privilege, associated with the company, that is assigned to the user;

in response to determining the predicted time, obtaining data for an information card based on the calendar data, the particular company, and the access privilege assigned to the user, from an entity database associated with the company, including information related to the particular company and a link element, the link element comprising a static portion and a dynamic portion, wherein the dynamic portion of the link element is specific to the particular company;

displaying, at the predicted time, the information card or an interactive control configured to initiate display of the information card;

when the information card is displayed, displaying the link element in the information card;

determining that a user input of the user selects the link element; and in response to determining the user input selects the link element, executing a link process.

16. The non-transitory computer-readable medium of claim 15, wherein the executing the link process further comprises:

obtaining link information from the information card;

extracting address information from the link information; and executing a link launch process to launch an application on the client device or launch a web page on the client device, in accordance with the address information.

17. The non-transitory computer-readable medium of claim 16, wherein the executing the link launch process comprises: extracting a text string form the address information; and performing one of:

executing the text string as a uniform resource locator (URL) in a web browser of the client device to access a web page corresponding to the URL, or executing the text string as a file path to open the application on the client device.

18. The non-transitory computer-readable medium of claim 17, wherein the address information comprises a static or a dynamic link.

19. The non-transitory computer-readable medium of claim 18, wherein, when the address information comprises the static link, the link launch process opens the application on the client device, opens the web page in the web browser, or opens a download application to download the application.

20. The non-transitory computer-readable medium of claim 18, wherein the text string of the address information includes a data element of a parameter portion of the text string, and further comprising:
- upon determining that the address information is for the dynamic portion of the link, opening, by the link launch process, the application to a particular feature or function of the application corresponding to the data element of the parameter portion of the address information;
- opening the web page in the web browser to a particular resource corresponding to the data element of the parameter portion of the address information;
- opening a download application to download the application and opening the application after the application has been downloaded to the particular feature or function of the application; or
- executing a search using the data element of the parameter portion of the address information in the web page, a search web page of a search engine, or a search engine application.

* * * * *

UNITED STATES PATENT AND TRADEMARK OFFICE
CERTIFICATE OF CORRECTION

| | |
|---|---|
| PATENT NO. | : 12,032,644 B2 |
| APPLICATION NO. | : 16/804575 |
| DATED | : July 9, 2024 |
| INVENTOR(S) | : Nida Imtiaz et al. |

It is certified that error appears in the above-identified patent and that said Letters Patent is hereby corrected as shown below:

In the Specification

Column 1, Lines 10-11, delete "CONTENT" and insert --CONTENT BASED ON CALENDAR DATA.--

Signed and Sealed this
Thirteenth Day of August, 2024

Katherine Kelly Vidal
*Director of the United States Patent and Trademark Office*